US011119995B2

(12) United States Patent
Ponnala et al.

(10) Patent No.: US 11,119,995 B2
(45) Date of Patent: Sep. 14, 2021

(54) SYSTEMS AND METHODS FOR SKETCH COMPUTATION

(71) Applicant: Ndata, Inc., Mountain View, CA (US)

(72) Inventors: Santhosh Rahul Ponnala, Santa Clara, CA (US); Tarang Vaish, Los Gatos, CA (US)

(73) Assignee: Ndata, Inc., Mountain View, CA (US)

( * ) Notice: Subject to any disclaimer, the term of this patent is extended or adjusted under 35 U.S.C. 154(b) by 0 days.

(21) Appl. No.: 16/718,686

(22) Filed: Dec. 18, 2019

(65) Prior Publication Data

US 2021/0191911 A1    Jun. 24, 2021

(51) Int. Cl.
*G06F 17/00* (2019.01)
*G06F 16/215* (2019.01)
*G06F 16/2455* (2019.01)
*H04L 9/06* (2006.01)

(52) U.S. Cl.
CPC ...... *G06F 16/215* (2019.01); *G06F 16/24568* (2019.01); *H04L 9/0643* (2013.01)

(58) Field of Classification Search
CPC . G06F 16/215; G06F 16/24568; H04L 9/0643
See application file for complete search history.

(56) References Cited

U.S. PATENT DOCUMENTS

| 7,069,268 B1 * | 6/2006 | Burns | H04L 45/00 |
| | | | 707/770 |
| 7,478,113 B1 | 1/2009 | De Spiegeleer et al. | |
| 7,504,969 B2 | 3/2009 | Patterson et al. | |
| 7,788,460 B2 | 8/2010 | Rothman et al. | |
| 8,412,848 B2 | 4/2013 | Therrien et al. | |

(Continued)

FOREIGN PATENT DOCUMENTS

| CN | 104424268 A | 3/2015 |
| CN | 105446964 A | 3/2016 |
| JP | 2018097450 A | 6/2018 |

OTHER PUBLICATIONS

Broder A. Identifying and Filtering Near-Duplicate Documents. Combinatorial Pattern Matching. CPM 2000. Lecture Notes in Computer Science, vol. 1848. pp. 1-10. 2000. Springer-Verlag Berlin Heidelberg 2000. https://doi.org/10.1007/3-540-45123-4_1.

(Continued)

*Primary Examiner* — Hasanul Mobin
(74) *Attorney, Agent, or Firm* — Wilson Sonsini Goodrich & Rosati

(57) ABSTRACT

A method for sketch computation is provided. The method may comprise receiving an input data stream from one or more client applications. The method may also comprise generating at least one segment from the input data stream. At least one segment may comprise a plurality of chunks. The method may further comprise computing a sketch of the at least one segment. The sketch may comprise a set of features that are representative of or unique to the at least one segment, such that the set of features corresponds to the at least one segment. The sketch may be useable for inline deduplication of at least one other input data stream received from the one or more client applications without (i) generation of a full index of the plurality of chunks or (ii) comparison of the at least one other input data stream to the full index.

25 Claims, 18 Drawing Sheets

(56) References Cited

U.S. PATENT DOCUMENTS

| | | | |
|---|---|---|---|
| 8,447,740 B1* | 5/2013 | Huang | G06F 16/1756 |
| | | | 707/692 |
| 8,521,704 B2 | 8/2013 | Bandopadhyay | |
| 8,612,392 B2 | 12/2013 | Yakushev et al. | |
| 8,793,466 B2 | 7/2014 | Shao et al. | |
| 8,812,461 B2 | 8/2014 | Li et al. | |
| 8,849,772 B1 | 9/2014 | Huang et al. | |
| 8,918,390 B1 | 12/2014 | Shilane et al. | |
| 8,935,446 B1 | 1/2015 | Shilane et al. | |
| 8,983,952 B1 | 3/2015 | Zhang et al. | |
| 9,069,478 B2 | 6/2015 | Hirsch et al. | |
| 9,069,785 B2 | 6/2015 | Huang et al. | |
| 9,092,802 B1 | 7/2015 | Akella | |
| 9,128,951 B1* | 9/2015 | Agrawal | G06F 16/1752 |
| 9,189,402 B1 | 11/2015 | Smaldone et al. | |
| 9,201,891 B2 | 12/2015 | Romanski et al. | |
| 9,262,434 B1* | 2/2016 | Shilane | G06F 16/1756 |
| 9,268,783 B1 | 2/2016 | Shilane et al. | |
| 9,311,323 B2 | 4/2016 | Chakraborty et al. | |
| 9,483,346 B2 | 11/2016 | Davis et al. | |
| 9,514,146 B1* | 12/2016 | Wallace | G06F 16/24561 |
| 9,575,680 B1 | 2/2017 | Zhang et al. | |
| 9,678,973 B2 | 6/2017 | Trimble et al. | |
| 9,696,936 B2 | 7/2017 | Aronovich | |
| 9,740,729 B2 | 8/2017 | Srinivasan et al. | |
| 9,852,151 B1 | 12/2017 | Youngworth | |
| 9,898,225 B2 | 2/2018 | Vijayan et al. | |
| 9,933,873 B2 | 4/2018 | Huang et al. | |
| 9,977,718 B1 | 5/2018 | Kulkarni et al. | |
| 1,038,737 A1 | 8/2019 | Hansen et al. | |
| 1,054,583 A1 | 1/2020 | Dain et al. | |
| 2005/0216669 A1 | 9/2005 | Zhu et al. | |
| 2007/0239947 A1* | 10/2007 | Li | G06F 3/0608 |
| | | | 711/154 |
| 2007/0245159 A1 | 10/2007 | Youn | |
| 2009/0077252 A1 | 3/2009 | Abdo et al. | |
| 2009/0182789 A1* | 7/2009 | Sandorfi | G06F 11/1453 |
| 2011/0185149 A1* | 7/2011 | Gruhl | G06F 3/0641 |
| | | | 711/206 |
| 2011/0231362 A1* | 9/2011 | Attarde | G06F 11/3442 |
| | | | 707/609 |
| 2011/0238635 A1 | 9/2011 | Leppard | |
| 2011/0307675 A1* | 12/2011 | Kano | G06F 11/2069 |
| | | | 711/162 |
| 2012/0016882 A1 | 1/2012 | Tofano | |
| 2012/0131025 A1 | 5/2012 | Cheung et al. | |
| 2012/0143715 A1 | 6/2012 | Eshghi et al. | |
| 2012/0151222 A1* | 6/2012 | Koifman | G06F 16/1727 |
| | | | 713/189 |
| 2012/0159098 A1 | 6/2012 | Cheung et al. | |
| 2012/0166448 A1 | 6/2012 | Li et al. | |
| 2012/0221768 A1* | 8/2012 | Bagal | G06F 12/0811 |
| | | | 711/103 |
| 2013/0232125 A1* | 9/2013 | Huang | G06F 16/1756 |
| | | | 707/692 |
| 2013/0232309 A1 | 9/2013 | Vijayan et al. | |
| 2013/0290474 A1 | 10/2013 | Therrien et al. | |
| 2013/0332467 A1 | 12/2013 | Bornea et al. | |
| 2014/0040616 A1* | 2/2014 | Barber | H04N 21/26606 |
| | | | 713/168 |
| 2014/0181575 A1* | 6/2014 | Kalach | G06F 11/1435 |
| | | | 714/6.11 |
| 2014/0223029 A1* | 8/2014 | Bhaskar | H04L 69/04 |
| | | | 709/247 |
| 2014/0258248 A1* | 9/2014 | Lambright | G06F 16/1724 |
| | | | 707/693 |
| 2014/0279956 A1 | 9/2014 | Trimble et al. | |
| 2015/0032978 A1 | 1/2015 | Bashyam et al. | |
| 2015/0058294 A1 | 2/2015 | Akirav et al. | |
| 2015/0149659 A1 | 5/2015 | Emadzadeh et al. | |
| 2015/0261779 A1 | 9/2015 | Huang et al. | |
| 2015/0293817 A1 | 10/2015 | Subramanian et al. | |
| 2016/0042007 A1 | 2/2016 | Vijayan et al. | |
| 2016/0196320 A1* | 7/2016 | Borowiec | G06F 11/1451 |
| | | | 707/624 |
| 2016/0291877 A1 | 10/2016 | Higuchi et al. | |
| 2017/0083581 A1 | 3/2017 | Kozlovsky et al. | |
| 2017/0123676 A1 | 5/2017 | Singhai et al. | |
| 2017/0123689 A1* | 5/2017 | Singhai | G06F 3/0613 |
| 2017/0132244 A1 | 5/2017 | Aronovich | |
| 2017/0177266 A1* | 6/2017 | Doerner | G06F 3/0641 |
| 2017/0364700 A1* | 12/2017 | Goldfarb | G06F 21/6218 |
| 2018/0039423 A1 | 2/2018 | Yoshii et al. | |
| 2018/0074745 A1* | 3/2018 | Harnik | G06F 3/067 |
| 2018/0095720 A1 | 4/2018 | Gopal et al. | |
| 2018/0196609 A1* | 7/2018 | Niesen | G06F 16/1752 |
| 2018/0349053 A1* | 12/2018 | Battaje | G06F 12/0891 |
| 2019/0114094 A1 | 4/2019 | Ki | |
| 2019/0220198 A1 | 7/2019 | Kashi et al. | |
| 2019/0220367 A1 | 7/2019 | Kashi et al. | |
| 2019/0332307 A1 | 10/2019 | Madan et al. | |
| 2019/0334803 A1* | 10/2019 | Ickin | H04L 65/4092 |
| 2019/0377509 A1 | 12/2019 | Wu | |
| 2020/0104188 A1 | 4/2020 | Kerai et al. | |
| 2020/0341667 A1 | 10/2020 | Bassov et al. | |
| 2020/0364516 A1 | 11/2020 | Krasner et al. | |

OTHER PUBLICATIONS

Fu, et al. Application-Aware Local-Global Source Deduplication for Cloud Backup Services of Personal Storage. IEEE Transactions on Parallel and Distributed Systems. vol. 25. No. 5. May 2014. pp. 1155-1165. doi: 10.1109/TPDS.2013.167.

Ghosh M. Data deduplication. The Pseudo Random Bit Bucket. Available at https://moinakg.wordpress.com/tag/data-deduplication/. Accessed on Jan. 3 2020.

Harnik, et al. Sketching Volume Capacities in Deduplicated Storage. 17th USENIX Conference on File and Storage Technologies (FAST '19). Feb. 25-28, 2019. Boston, MA USENIX Association. 17 Slides.

Harnik, et al. Sketching Volume Capacities in Deduplicated Storage. 17th USENIX Conference on File and Storage Technologies (FAST '19). Feb. 25-28, 2019. Boston, MA. USENIX Association. pp. 107-119.

Hirose S. Yet Another Definition of Weak Collision Resistance and Its Analysis. Information Security and Cryptology—ICISC 2003. ICISC 2003. Lecture Notes in Computer Science, vol. 2971. pp. 87-96. Springer-Verlag Berlin Heidelberg 2004. https://doi.org/10.1007/978-3-540-24691-6_8.

Jayaram, et al. An Empirical Analysis of Similarity in Virtual Machine Images. Middleware '11: Proceedings of the Middleware 2011 Industry Track Workshop. Dec. 12, 2011. Lisbon, Portugal. Article No. 6. pp. 1-6. https://doi.org/10.1145/2090181.2090187.

Li, et al. Information Leakage in Encrypted Deduplication via Frequency Analysis. 2017 47th Annual IEEE/IFIP International Conference on Dependable Systems and Networks (DSN). Jun. 26-29, 2017. Denver, CO. pp. 1-12. doi: 10.1109/DSN.2017.28.

Lillibridge, et al. Improving Restore Speed for Backup Systems that Use Inline Chunk-Based Deduplication. 11th USENIX Conference on File and Storage Technologies (FAST '13). Feb. 12-15, 2013. San Jose, CA. USENIX Association. pp. 183-197.

Lillibridge, et al. Sparse Indexing: Large Scale, Inline Deduplication Using Sampling and Locality. Available at https://www.usenix.org/legacy/events/fast09/tech/full_papers/lillibridge/lillibridge_html/index.html. Accessed on Nov. 1, 2019.

Weinsheimer J. Understanding Variable Length Deduplication. Clearpath's Blog on IT Infrastructure, Hybrid Clouds and IT Security. Dec. 20, 2012. Available at https://blog.clearpathsg.com/blog/bid/254076/understanding-variable-length-deduplication. Accessed on Jan. 3, 2020.

Wikipedia. Data deduplication. Available at https://en.wikipedia.org/wiki/Data_deduplication. Accessed on Jan. 3, 2020.

Won, et al. MUCH: Multithreaded Content-Based File Chunking. IEEE Transactions on Computers. vol. 64. No. 5. pp. 1375-1388. May 1, 2015. doi: 10.1109/TC.2014.2322600.

(56) References Cited

OTHER PUBLICATIONS

Xu, et al. Online Deduplication for Databases. SIGMOD '17: Proceedings of the 2017 ACM International Conference on Management of Data. May 2017. pp. 1355-1368. https://doi.org/10.1145/3035918.3035938.
U.S. Appl. No. 16/718,703 Office Action dated May 18, 2020.
U.S. Appl. No. 16/718,714 Office Action dated Apr. 7, 2020.
Office action dated Jul. 29, 2020 for U.S. Appl. No. 16/718,714.
International search report with written opinion dated Apr. 14, 2021 for PCT/US2020/065711.
Notice of Allowance dated Dec. 23, 2020 for U.S. Appl. No. 16/718,714.
Office action dated Oct. 9, 2020 for U.S. Appl. No. 16/718,703.
Zhukov, et al. Analysis and estimation of the trie minimum level in non-hash deduplication system. Scientific and Technical Journal of Information Technologies, Mechanics and Optics. May-Jun. 2015. (15)3: 470-475. (Russian with English summary).
Office action dated Jun. 11, 2021 for U.S. Appl. No. 16/718,703.

* cited by examiner

SYSTEMS AND METHODS FOR SKETCH COMPUTATION

BACKGROUND

Cloud storage systems can store large amounts of data from client applications, for example enterprise applications. Quite often a substantial portion of the incoming data may be duplicative. A large amount of memory, storage space, and processing power may be required to store and process the data. In some cases, data can be reduced prior to storage, for example using deduplication or compression techniques. However, large scale data reduction using small chunks and 1:1 chunk comparisons had been shown to be technically challenging or impractical, due to the large index table generated which consumes significant memory space and reduces performance (by adding computational burden on both the write and read process). As result, conventional deduplication techniques are generally unable to handle data reduction on hundreds of terabyte or petabyte scale, in particular the large volumes of data generated by enterprise applications.

SUMMARY

With the exponential scaling in data generation, a need is recognized herein for methods and systems that can efficiently handle data reduction on a large scale, while maintaining or improving computing performance. Data reduction can lead to a decrease in operational costs with respect to computational resources and storage.

The present disclosure provides systems and methods that are configured to optimally reduce data on a large scale (e.g. on at least a petabyte scale) at a high throughput (e.g. on at least terabyte level per day, or hundred terabyte per day, or multiple terabytes per day, etc). The systems and methods herein can be applied to data generated by various client applications, for example enterprise applications. As used herein, the term "data" may refer to any type of data, for example structured data, unstructured data, time series data, relational data, and the like. The term "enterprise application" may refer to a large software system platform that is developed using enterprise architecture and designed to operate in a corporate environment such as business or government. Although some embodiments of the present disclosure have been described with respect to enterprise applications, it should be appreciated that some embodiments herein can be applicable or adapted for non-enterprise applications or other smaller scale applications.

In an aspect, the present disclosure provides a method for sketch computation, comprising: (a) receiving an input data stream from one or more client applications; (b) generating at least one segment from the input data stream, wherein the at least one segment comprises a plurality of chunks; (c) computing a sketch of the at least one segment, wherein the sketch comprises a set of features that are representative of or unique to the at least one segment, such that the set of features corresponds to the at least one segment, and wherein the sketch is useable for inline deduplication of at least one other input data stream received from the one or more client applications without (i) generation of a full index of the plurality of chunks or (ii) comparison of the at least one other input data stream to the full index.

In some embodiments, the set of features may comprise a minimal number of features that are useable to uniquely identify or distinguish the at least one segment from another segment. In some embodiments, the minimal number of features may range from about 3 features to about 15 features. In some embodiments, the minimal number of features may comprise no more than 15 features.

In some embodiments, the at least one segment may have a size of at least about 1 megabyte (MB). In some embodiments, the at least one segment may have a size ranging from about 1 megabyte (MB) to about 4 MB.

In some embodiments, the plurality of chunks may comprise at least about 100 chunks. In some embodiments, the plurality of chunks may comprise at least about 1000 chunks.

In some embodiments, the plurality of chunks may be of variable lengths. In some embodiments of the method, step (b) may further comprise generating a plurality of segments from the input data stream, which the plurality of segments comprises the at least one segment. In some embodiments, segments of the plurality of segments have different sizes ranging from about 1 megabyte (MB) to about 4 MB. In some embodiments, segments of the plurality of segments may have approximately a same size within a range of about 1 megabyte (MB) to about 4 MB.

In some embodiments of the method, step (b) may further comprise generating a fingerprint for each chunk of the plurality of chunks. In some embodiments, the fingerprint may be generated using one or more hashing algorithms. In some embodiments, the fingerprint may be generated using one or more non-hashing algorithms. In some embodiments, the set of features may be associated with a subset of chunks selected from the plurality of chunks.

In some embodiments, the set of features may comprise a set of fingerprints for the subset of chunks. In some embodiments, the set of fingerprints may comprise a plurality of chunk hashes for the subset of chunks. In some embodiments, the subset of chunks may be less than about 10% of the plurality of chunks. In some embodiments, the subset of chunks may be less than about 1% of the plurality of chunks. In some embodiments, the subset of chunks may comprise about 3 chunks to about 15 chunks.

In some embodiments, the subset of chunks may be selected from the plurality of chunks using one or more fitting algorithms on a plurality of hashes generated for the plurality of chunks. In some embodiments, the one or more fitting algorithms may be used to determine a minimum hash for each hash function of the two or more different hash functions. In some embodiments, the plurality of hashes may be generated using two or more different hash functions. In some embodiments, the two or more different hash functions may be selected from the group consisting of Secure Hash Algorithm 0 (SHA-0), Secure Hash Algorithm 1 (SHA-1), Secure Hash Algorithm 2 (SHA-2), and Secure Hash Algorithm 3 (SHA-3).

In some embodiments, each feature of the set of features may comprise the minimum hash for each hash function of the two or more different hash functions. In some embodiments, the set of features may comprise a vector of the minimum hashes of the two or more different hash functions. In some embodiments, the set of features may be provided as a linear combination of the features comprising the vector.

In another aspect, the present disclosure provides a method for data processing, comprising: (a) receiving one or more input data streams from one or more client applications; (b) generating at least a first segment and a second segment from the one or more input data streams, wherein the first segment comprises a first set of chunks and the second segment comprises a second set of chunks; (c) computing (i) a first set of fingerprints of the first plurality of chunks and (ii) a second set of fingerprints of the second plurality of chunks; (d) processing the first set of fingerprints and the second set of fingerprints to determine that the first set of chunks and the second set of chunks meet a similarity threshold; and (e) processing the first set of chunks and the second set of chunks to determine one or more differences between the first segment and the second segment.

In some embodiments, the first segment and the second segment may be determined to be similar based at least on the similarity threshold.

In some embodiments, the similarity threshold may be at least about 50%. In some embodiments, the similarity threshold may be indicative of a degree of overlap between the first set of chunks and the second set of chunks.

In some embodiments, the second segment may be of about a same size as the first segment. In some embodiments, the second segment may be of a substantially different size than the first segment.

In some embodiments, the first segment and the second segment each may have a size ranging from about 1 megabyte (MB) to about 4 MB.

In some embodiments, the first set of chunks and the second set of chunks may have a different number of chunks.

In other embodiments, the first set of chunks and the second set of chunks may have a same number of chunks.

In some embodiments, the first set of chunks and the second set of chunks may each comprise at least about 100 chunks. In some embodiments, the first set of chunks and the second set of chunks may each comprise at least about 1000 chunks.

In some embodiments, the first set of chunks and the second set of chunks may be of variable lengths.

In some embodiments, the first set of fingerprints may be associated with a first subset of chunks selected from the first set of chunks, and the second set of fingerprints may be associated with a second subset of chunks selected from the second set of chunks. In some embodiments, the first set of fingerprints may comprise a first plurality of chunk hashes for the first subset of chunks, and the second set of fingerprints may comprise a second plurality of chunk hashes for the second subset of chunks. In some embodiments, the first subset of chunks may be less than about 10% of the first set of chunks. In some other embodiments, the first subset of chunks may be less than about 1% of the first set of chunks. In some further embodiments, the second subset of chunks may be less than about 10% of the second set of chunks. In some embodiments, the second subset of chunks may be less than about 1% of the second set of chunks.

In some embodiments, the first subset of chunks and the second subset of chunks may have a same number of chunks. In other embodiments, the first subset of chunks and the second subset of chunks may have a different number of chunks. In some embodiments, the first subset of chunks and the second subset of chunks may each comprise about 3 chunks to about 15 chunks.

In some embodiments, the first and second subsets of chunks may be selected from the first and second sets of chunks using one or more fitting algorithms on a plurality of hashes generated for the first and second sets of chunks. In some embodiments, the one or more fitting algorithms may comprise a minimum hash function.

In some embodiments, the first set of fingerprints and the second set of fingerprints may be generated using one or more hashing algorithms. In some embodiments, the one or more hashing algorithms may be selected from the group consisting of Secure Hash Algorithm 0 (SHA-0), Secure Hash Algorithm 1 (SHA-1), Secure Hash Algorithm 2 (SHA-2), and Secure Hash Algorithm 3 (SHA-3). In some embodiments, the first set of fingerprints and the second set of fingerprints may be generated using two or more different hashing algorithms selected from the group.

In some other embodiments, the first set of fingerprints and the second set of fingerprints may be generated using one or more non-hashing algorithms.

In a further aspect, the present disclosure provides a method for data reduction, comprising: (a) receiving one or more input data streams from one or more client applications; (b) generating at least a first segment and a second segment from the one or more input data streams, wherein the first segment comprises a first plurality of chunks and the second segment comprises a second plurality of chunks; (c) computing (i) a first sketch of the first segment and (ii) a second sketch of the second segment, wherein the first sketch comprises a first set of features that are representative of or unique to the first segment, wherein the second sketch comprises a second set of features that are representative of or unique to the second segment, wherein the first set of features corresponds to the first segment and the second set of features corresponds to the second segment; (d) processing the first sketch and the second sketch to generate a similarity metric indicative of whether the second segment is similar to the first segment; and (e) subsequent to (d), (1) performing a differencing operation on the second segment relative to the first segment when the similarity metric is greater than or equal to a similarity threshold, or (2) storing the first segment and the second segment in a database without performing the differencing operation when the similarity metric is less than the similarity threshold.

In some embodiments, the differencing operation in (e) may comprise (i) generating a reference set of hashes for the first plurality of chunks of the first segment, and (ii) storing the reference set of hashes in a memory table. In some embodiments, the reference set of hashes may comprise weak hashes. In some embodiments, the reference set of hashes may be generated using a hashing function having a throughput of at least a gigabyte (GB) scale. In some embodiments, the differencing operation may further comprise (iii) generating, on a sequential rolling basis, a hash for a chunk of the second plurality of chunks of the second segment, and (iv) comparing the hash to the reference set of hashes to determine if there is a match.

In some embodiments, the differencing operation may further comprise (v) continuing to generate one or more other hashes for one or more subsequent chunks of the second plurality of chunks, as long as the hash and the one or more other hashes find a match from the reference set of hashes.

In some embodiments, the differencing operation may further comprise (vi) generating and storing a single pointer referencing the chunk and the one or more subsequent chunks, upon detecting that a hash for a follow-on chunk does not find a match from the reference set of hashes.

In some embodiments, the hash may be a weak hash.

In some embodiments, the one or more other hashes may comprise weak hashes. In some embodiments, the hash and the one or more other hashes may comprise weak hashes.

In some embodiments, the hash may be compared to the reference set of hashes to determine if there is a match, before generating another hash for a next chunk of the second plurality and comparing the another hash to the reference set of hashes to determine if there is a match.

In some embodiments, the differencing operation may be performed inline as the one or more input data streams are received from the one or more client applications.

In some embodiments, the differencing operation may reduce the first segment and the second segment into a plurality of homogenous fragments. In some embodiments, the method may further comprise storing the plurality of homogenous fragments in one or more cloud object datastores. In some embodiments, the method may further comprise generating an index that maps the plurality of homogeneous fragments to the first segment and the second segment. In some embodiments, the method may further comprise: receiving a read request transmitted from the one or more client applications, wherein the read request may be for an object comprising at least one of the first segment or the second segment; and reconstructing the first segment or the second segment using at least in part (1) the plurality of homogenous fragments stored in the one or more cloud object datastores and (2) the index, to generate the object in response to the read request. In some embodiments, the method may further comprise providing the generated object to the one or more client applications that transmitted the read request.

In some embodiments of the method, the processing in step (d) may comprise comparing the second set of features with the first set of features to determine whether one or more features are common in both the first set and the second set.

In some embodiments, the second segment may be determined to be (i) similar to the first segment when the similarity metric is greater than or equal to the similarity threshold, or (ii) non-similar to the first segment when the similarity metric is less than the similarity threshold. In some embodiments, the similarity threshold may be at least about 50%.

In some embodiments, the similarity metric may be indicative of a degree of overlap between the first segment and the second segment. In some embodiments, the one or more features may be similar or identical in the first set and the second set.

In some embodiments, the second segment may be of about a same size as the first segment.

In some other embodiments, the second segment may be of a substantially different size than the first segment.

In some embodiments, the first segment and the second segment may each have a size ranging from about 1 megabyte (MB) to about 4 MB.

In some embodiments, the first set and the second set each may comprise about 3 features to about 15 features.

In some embodiments, the first plurality of chunks and the second plurality of chunks may each comprise at least about 100 chunks.

In some embodiments, the first plurality of chunks and the second plurality of chunks may be of variable lengths.

In some embodiments of the method, step (e) may further comprise storing the first sketch and the second sketch in the database when the similarity metric is less than the similarity threshold.

In some embodiments, the similarity metric may be a similarity score.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
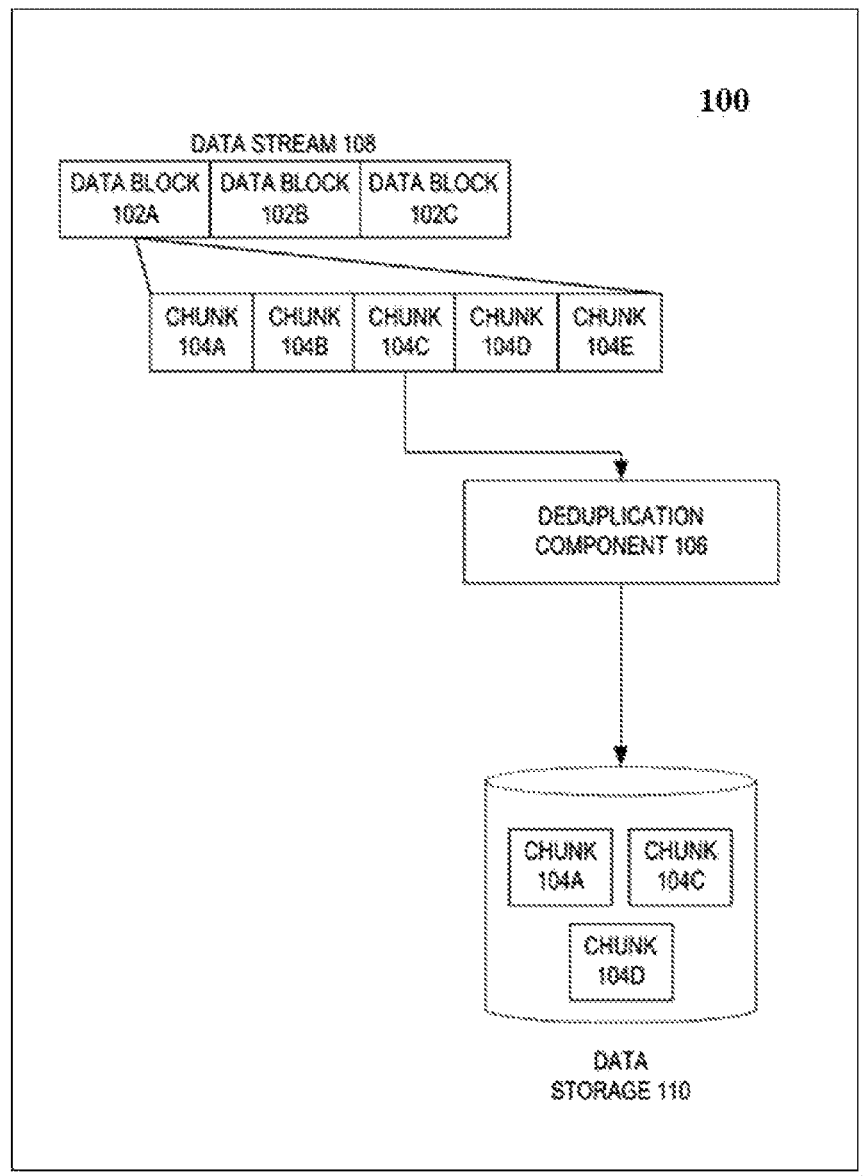
FIG. 1 illustrates a module for deduplicating data prior to storing data, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real-time," as used herein, generally refers to a simultaneous or substantially simultaneous occurrence of a first event or action with respect to occurrence of a second event or action. A real-time action or event may be performed within a response time of less than 1 second, tenth of a second, hundredth of a second, a millisecond, or less relative to at least another event or action. A real-time action may be performed by one or more computer processors.

The term "sketch," as used herein, generally refers to a fingerprint of at least one data unit, such as at least one data segment. A sketch may be used to describe or characterize data segment(s) of a file or object. A sketch may include a set of features that can be used to describe or characterize data segment(s).

The term "weak hashing algorithm," or the like, as used herein, generally refers to a hashing algorithm that maximizes the number of data chunks hashed per unit of time at the cost of decreasing the total number of collisions of hashed data chunks. Collisions may occur when a hashing algorithm produces the same hash value for different data chunks.

The term "strong hashing algorithm," or the like, as used herein, generally refers to a hashing algorithm that minimizes the total number of collisions of hashed data chunks at the cost of maximizing the number of hashed data chunks hashed per unit of time. Collisions may occur when a hashing algorithm produces the same hash value for different data chunks.

Overview

Data reduction may be the process of reducing the amount of capacity required to store data. The data reduction system described herein can increase storage efficiency, improve processing/computing speed performance, and reduce costs, among other advantages.

Conventional methods to handle data reduction for data storage systems generally rely on segmenting data into chunks, generating fingerprints (e.g., hashes) for the chunks of data, and storing the fingerprints in an in-memory table. After the fingerprints are computed, a lookup can be performed in-memory to compare a chunk to a new chunk. Upon a fingerprint match in memory, if the new chunk is considered to be unique, the new chunk may be stored. If the new chunk is considered to be the same, a pointer may be stored that points to the originally stored chunk. This process requires significant storage space to store each fingerprint. Additionally, this process requires significant processing and computational time to generate each fingerprint for each chunk and then to compare each fingerprint corresponding to each chunk to another fingerprint of a different chunk. Calculating and processing fingerprints for each chunk can be time intensive and computationally expensive.

The data reduction system and methods described herein can address at least the shortcomings of conventional data deduplication techniques. For example, instead of doing a direct comparison of fingerprints (hashes) between all of the individual data chunks, the data reduction system and methods provided herein can use sketches to describe or characterize large segments of data in a file or object, and compare sketches to determine if two or more segments are homogeneous (e.g., similar). Sketches may comprise a set of features that can be used to describe or characterize large segments data. If the sketches of two or more segments are determined to be substantially similar, the sketches can be subsequently differenced at a more granular level (e.g., feature level, chunk level, etc.), at which time fingerprint comparisons can be performed. A single pointer may be generated for a group of chunks with matching fingerprints, instead of a pointer for an individual chunk. If the sketches of two or more segments are determined to be substantially different, the segments and their set of features may be stored in the database, and differencing at the chunk level need not be required, which can save computational resources for deduplication of other similar segments.

Figure 10:
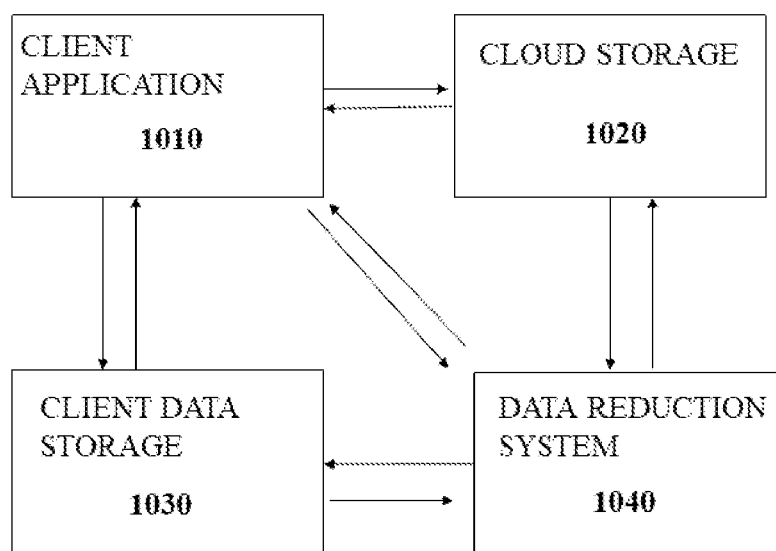
FIG. 10 illustrates the ecosystem for the data reduction system, in accordance with some embodiments of the present disclosure.

A data reduction system 1040 in accordance with some embodiments herein may exist in an ecosystem, for example, as shown in FIG. 10. The ecosystem may comprise one or more client applications 1010, and one or more storage modules 1020 and 1030.

Figure 11:
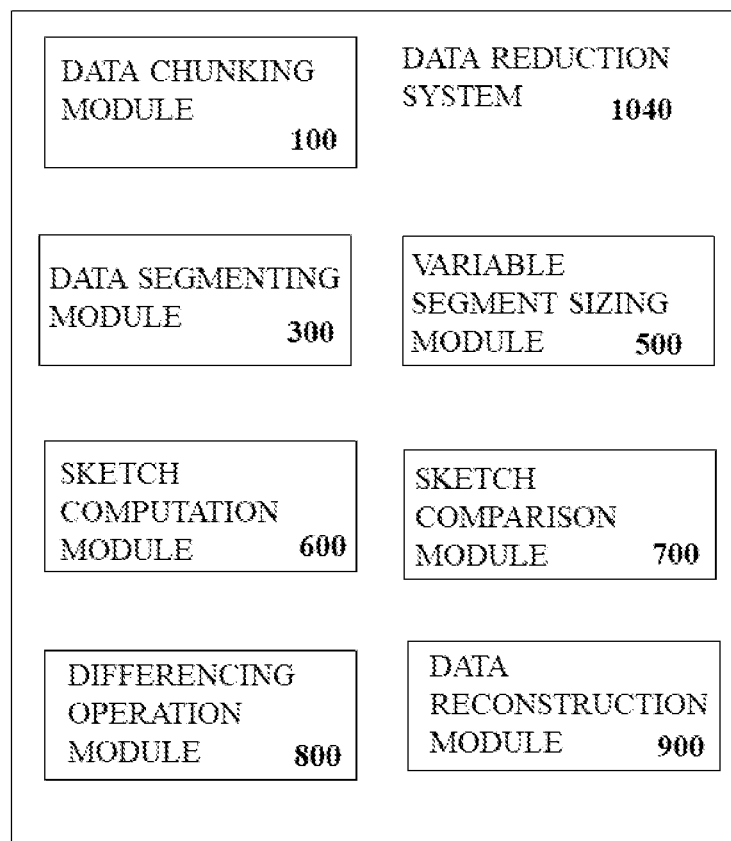
FIG. 11 illustrates the modules for the data reduction system, in accordance with some embodiments of the present disclosure.

The data reduction system 1040 described herein may comprise one or more modules. As shown in FIG. 11, the modules may include a sketch computation module 600, a sketch comparison module 700, a differencing operation module 800, a data reconstruction module 900, a data chunking module 100, a data segmenting module 300, a variable segment sizing module 500, or various combinations thereof, etc. The functionalities of each module may be generally described as follows.

The sketch computation module can be configured to compute one or more sketches, for one or more data segments generated from one or more input data streams. After the sketches have been generated for segments, the sketch comparison module can determine if the sketch for a new segment is substantially similar or non-similar to the sketch for an earlier segment. If the two sketches are determined to be substantially non-similar, the new segment may be stored in a database. If the two sketches are determined to be substantially similar, the differencing operation module is then utilized to compare the chunks between the segments and determine if the segments have one or more duplicative chunks that are common to both segments. The differencing module can be configured to generate a sparse index array and store pointers for blocks of duplicative chunks. The blocks of duplicative chunks may be stored in a database as homogeneous fragments. Upon receipt of a read request from a client application, the data reconstruction module can reconstruct a requested object (that is requested from the client application) using the sparse index array and the homogenous fragments generated by the differencing module. Additional aspects relating to the breaking up of data using the data chunking module, data segmenting module, or variable segment sizing module are further described in detail elsewhere herein.

I. Sketch Computation

In an aspect, a method for sketch computation is provided. A sketch may be a data structure supporting a pre-specified set of queries and updates to a database. A sketch may consume less memory space compared to storing all information for an entire segment. A sketch may be a fingerprint of a segment. Sketch computation may be used to decrease memory requirements and provide faster speeds for data write and read processes. Sketch computation may involve generating a set of features from at least one segment. The set of features may be used as an approximate identifier of the segment (e.g. as a fingerprint) such those features (or a subset of those features) could be used to identify similar segments. A sketch can be computed by determining a set of features using hashing algorithms (e.g., hashing function) and/or other algorithms (e.g. non-hashing algorithms) as described elsewhere herein. A sketch may be representative of one or more data segments. In some embodiments, a sketch may be a metadata value. A sketch may be utilized to find matching or similar sketches associated with other segments from one or more input data streams. A sketch may be utilized to find matching or similar sketches associated with previously processed segments.

Figure 6A:
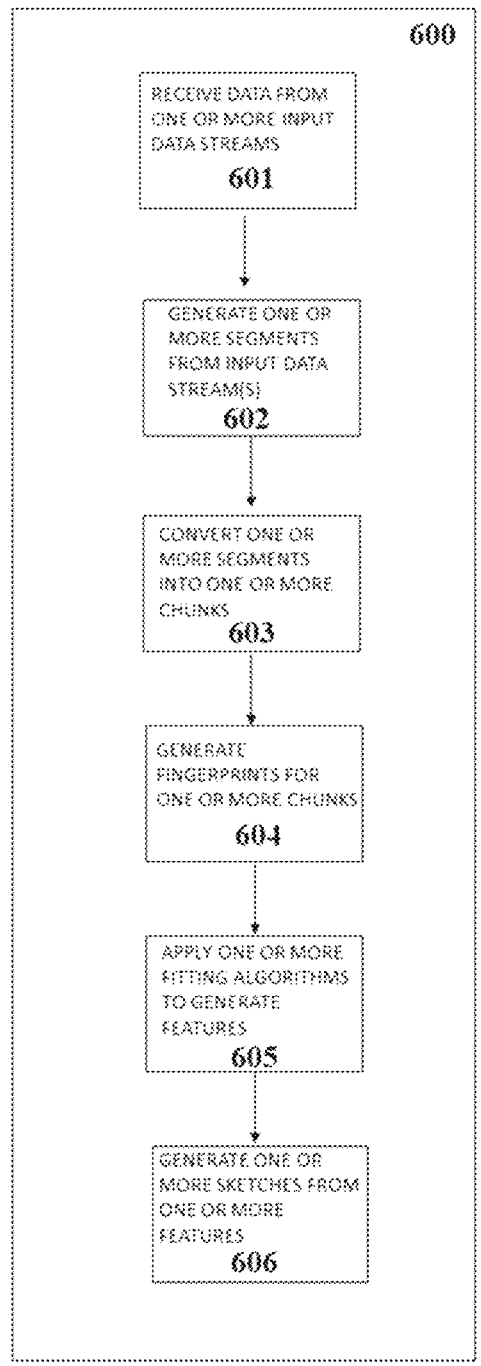
FIGS. 6A and 6B illustrate a flow diagram and elements for computing a sketch, in accordance with some embodiments of the present disclosure.
Figure 6B:
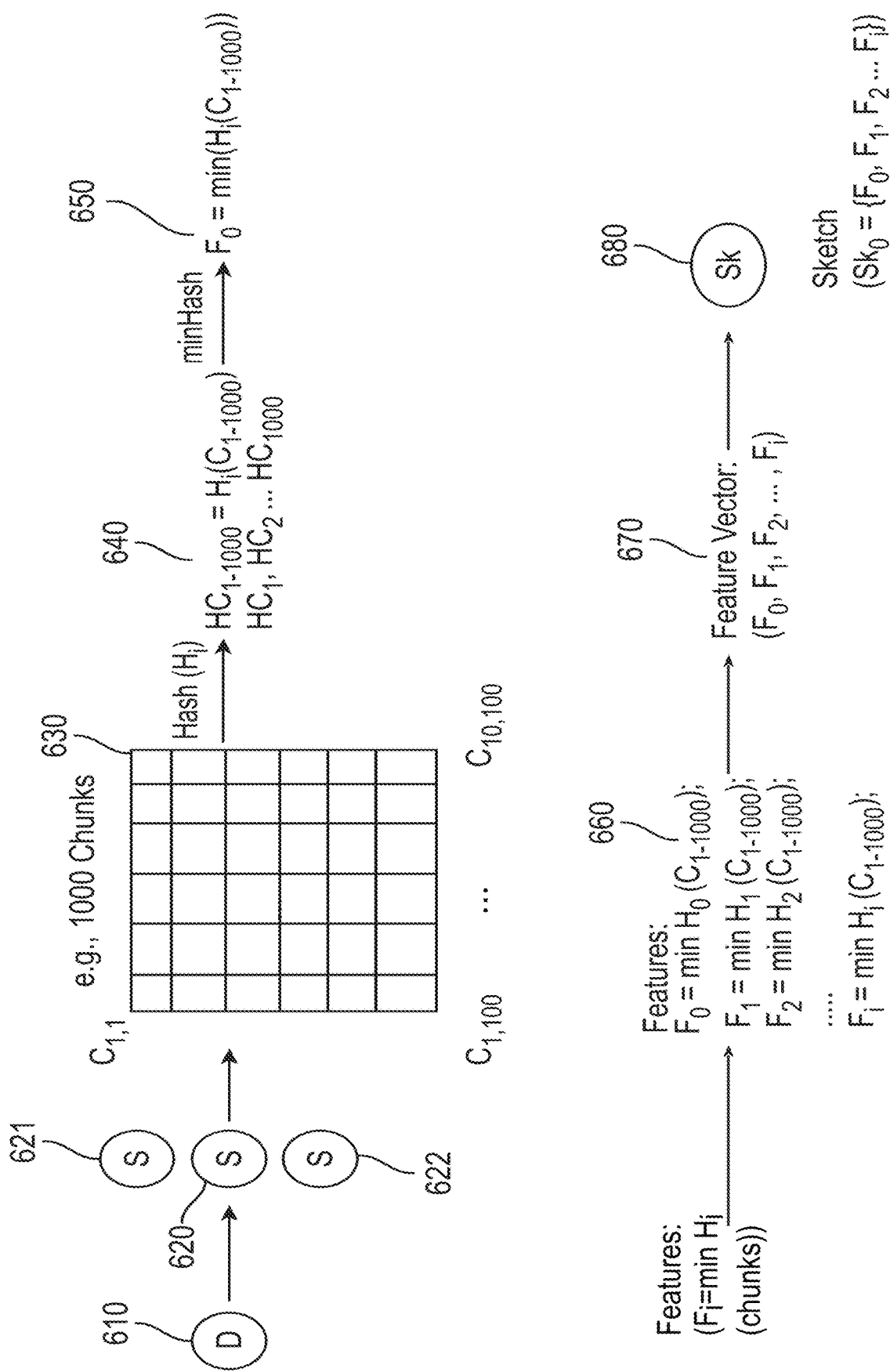

A sketch may be computed using the sketch computation module 600. An example of a sketch computation module and sketch computation is illustrated with FIGS. 6A and 6B. As shown in FIG. 6B, an input data stream (610) may be used for sketch computation. The method may comprise receiving an input data stream from one or more client applications (step 601). The input data stream may include a sequence of data made available over time. The input data stream may be a sequence of digitally encoded coherent signals (e.g., packets of data, data packets, network packets, etc) used to transmit or receive information that is in the process of being transmitted. The input data stream may comprise data, data packets, files, objects, etc. The input data stream may include a set of extracted information. The input data stream may comprise raw data (e.g., unprocessed data, unstructured data, etc). The input data stream may comprise structured data. The input data stream may be, for example, network traffic, graph streams, client-application data streams, or multi-media streams, etc. The input data stream may comprise at least one segment.

The client application may be an application that is configured to run on a workstation or a personal computer. The workstation or personal computer may be in a network. The client application may include an enterprise application. In some embodiments, the enterprise application may be a large software system platform designed to operate in a corporate environment. The enterprise application may be designed to interface or integrate with or without other applications used within an organization. The enterprise application may be a computer software used to satisfy the needs of an organization rather than individual users. Such organizations may include, for example, businesses, governments, etc. The enterprise application may be an integral part of a (computer-based) information system. Enterprise applications may assist in, for example, data management, business intelligence, business process management, knowledge management, customer relationship management, databases, enterprise resource planning, enterprise asset management, low-code development platforms, supply chain management, product data management, product lifecycle management, networking and information security, online shopping, online payment processing, interactive product catalogue, automated billing systems, security, Business Process Management, enterprise content management, IT Service Management, customer relationship management, enterprise resource planning, business intelligence, project management, collaboration, human resource management, manufacturing, occupational health and safety, enterprise application integration, information storage or enterprise forms automation, etc. The complexity of enterprise applications may require specialized capabilities and specific knowledge.

As shown in FIG. 6B, the method may comprise generating at least one segment from the input data stream (step 602). The method may further comprise computing a sketch of the at least one segment as described elsewhere herein. As shown in FIG. 6B, one or more segments 620-622 in an input data stream 610 can be generated (step 602). In some embodiments, a plurality of segments can be generated from the input data stream. The plurality of segments may comprise at least about 1, 5, 10, 15, 25, 100, 1000, 10000 or more segments. The plurality of segments may have sizes of at least about 1 kilobyte (KB), 10 KB, 100 KB, 500 KB, 1 megabyte (MB), 2 MB, 3 MB, 4 MB, 5 MB, 6 MB, 7 MB, 8 MB, 9 MB, 10 MB or more. The plurality of segments may have sizes of at most about 10 MB, 9 MB, 8 MB, 7 MB, 6 MB, 4 MB, 3 MB, 2 MB, 1 MB, 500 KB, 100 KB, 10 KB, or less. The plurality of segments may have sizes from about 100 KB to 10 MB, 500 KB to 5 MB, or 1 MB to 4 MB. In some embodiments, each of the plurality of segments may have a size ranging from about 1 MB to about 4 MB. In some embodiments, the plurality of segments may have different sizes ranging from about 1 MB to about 4 MB.

The segment can be generated from the input data stream as described elsewhere herein. Each segment may comprise a plurality of chunks. As shown in FIG. 6B, the segment may be converted into a plurality of chunks 630. The segment may be converted into, for example, 1000 chunks. A chunk may comprise data. A chunk may be a fragment of information. A chunk may be a unit of information. A chunk may contain a header. The header may indicate parameters of the chunk. The parameters may include, for example, the type of chunk, comments, size, etc. The process of taking a segment and producing one or more chunks may be called chunking. Chunking may comprise the division of data within a data segment into a number of sections (e.g., chunks) of continuous data (e.g., from the input data stream). Chunking can be used to, for example, reduce central processing unit (CPU) overhead or decrease latency. In some embodiments, the segment may comprise at least about 5, 10, 15, 25, 100, 1000, 10000 or more chunks. The segment may comprise from about 2 to 10000 chunks, 10 to 1000 chunks, or 25 to 100 chunks. In some embodiments, the segment may comprise at least about 1000 chunks. The plurality of chunks may be of a same length or variable lengths. The plurality of chunks may be of the same data size. The plurality of chunks may be of different data size. The plurality of chunks may have sizes of at least about 0.1 kilobytes (KB), 0.5 KB, 1 KB, 2 KB, 3 KB, 4 KB, 5 KB, 6 KB, 7 KB, 8 KB, 9 KB, 10 KB, 50 KB or more. The plurality of chunks may have sizes ranging from 0.1 KB to 10 KB, 0.5 KB to 7 KB, or 1 KB to 4 KB. In some embodiments, the plurality of chunks may have sizes ranging from 4 KB to 16 KB.

The method may further comprise generating a fingerprint for each chunk of the plurality of chunks using step 604 and further illustrated in FIG. 6B. The fingerprint may be utilized to identify a specific data chunk. In some embodiments, the fingerprint may be generated using one or more hashing algorithms. The fingerprint may include one or more hash values generated by one or more hashing algorithms. As shown in FIG. 6B, a hashing algorithm may be executed on the chunks (e.g. 1000 chunks) to generate a plurality of hash values 640 (e.g. 1000 hash values). Each hash value may be a fingerprint associated with each respective chunk. In some embodiments, more than one hash value may be calculated for a particular chunk.

The hashing algorithm (e.g., hash(ing) function) described herein may include any method that can be used to map data of arbitrary size to fixed-size values. The values returned by a hash function may be called hash values, hash codes, digests, or hashes. The values may be used to index a fixed-size table called a hash table. In some cases, a cryptographic grade hash functions may be used to generate a fingerprint. The cryptographic grade hash function may be keyed, unkeyed, or use a combination thereof. The hash functions may be selected from the group consisting of SHA-0, SHA-1, SHA-2, SHA-3, SHA-224, SHA-256, SHA-384, SHA-512, SHA-512/224, SHA-512/256, SHA3-224, SHA3-256, SHA3-384, SHA3-512, SHAKE128, SHAKE256, BLAKE-256, BLAKE-512, BLAKE2s, BLAKE2b, BLAKE2X, ECOH, FSB, GOST, Grøstl, HAS-160, HAVAL, JH, LSH, MD2, MD4, MD5, MD6, Radio-Gatún, RIPEMD, RIPEMD-128, RIPEMD-160, RIPEMD-320, Skein, Snefru, Spectral Hash, Streebog, SWIFFT, Tiger, Whirlpool, HMAC, KMCA, One-key MAC, PMAC, Poly1305-AES, SipHash, UMAC, VMAC, Pearson hashing, Paul Hsieh's SuperFastHash, Buzhash, Fowler-Noll-Vo hash function, Jenkins hash function, Bernstein hash djb2, PJW hash, MurmurHash, Fast-Hash, SpookyHash, City-Hash, FarmHash, MetroHash, number hash, xxHash, tlha, cksum (Unix), CRC-16, CRC-32, Rabin fingerprint, tabulation hashing, universal one-way hash function, and Zobrist hashing. Additionally or alternatively, the fingerprint may also be generated using one or more non-hashing algorithms.

The method may further comprise generating a plurality of features for the segment. A sketch of a segment may comprise a set of features (e.g., characteristics) that are representative of, or unique to the segment. Feature generation or extraction can reduce the amount of resources required to describe the segment. Features may describe the most relevant information from the segment. The features of a segment may not change even as small variations are introduced into the chunks. The features may describe the relevant information from the segment such that the desired task (e.g., chunk comparison) can be performed by using the reduced representations (e.g., sketch comparison of the features) instead of using the entire set of chunks. The feature may include, for example, certain items associated with chunks within the segment. The items may include, for example, hash values generated by one or more hashing algorithms. The items may include, for example, an integer (e.g., an ID number, hash value), a data type, a file extension, etc.

The set of features in a sketch of a segment may comprise a minimum number of features that may be useable to uniquely identify or distinguish the segment. The set of features may comprise at least about 1, 2, 3, 4, 5, 10, 15, 25, 100, 100 or more features. The set of features may comprise at most about 100, 100, 25, 15, 10, 5, 4, 3, 2, or fewer features. The set of features may include from about 1 to 100, 2 to 25, 3 to 15, or 5 to 10 features. In some embodiments, the set of features in a sketch of a segment may range from about 3 to about 15 features. The set of features may comprise a linear combination of the features. The set of features may be used to approximate the segment.

In some embodiments, the set of features may be associated with a subset of chunks selected from the plurality of chunks. The set of features may comprise a set of fingerprints for the subset of chunks. The set of fingerprints may comprise chunk hashes for the subset of chunks. The subset of chunks may be less than about 1%, 5%, 10%, 15%, 20%, 25%, 30%, 40%, 50% of the plurality of chunks. The subset of chunks may be from about 1% to 50%, 5% to 40%, or 10% to 25% of the plurality of chunks. The subset of chunks may comprise at least about 1, 2, 3, 4, 5, 6, 7, 8, 9, 10, 11, 12, 13, 14, 15, 16, 17, 18, 19, 20, 50, 100, or more chunks. The subset of chunks may be selected from the plurality of chunks using one or more fitting algorithms on a plurality of hashes generated for the plurality of chunks. In some embodiments, the plurality of hashes may be generated using two or more different hash functions. The two or more different hash functions may include any of the hash functions as described elsewhere herein.

In some embodiments, the one or more fitting algorithms may be used to determine a minimum hash of the entire set of chunks or subset of chunks (step 605). A feature may correspond to the minimum hash value for the entire set of chunks or subset of chunks. As shown in FIG. 6B, the fitting algorithms may be used to obtain the minimum hash value of the 1000 hashes values (e.g., fingerprints; 650) corresponding to a particular chunk. The one or more fitting algorithms may be used to compute the minimum hash value as the hash value for each chunk is generated. The one or more fitting algorithms may be used to compute the minimum hash value after all the hash values for the entire set of chunks has been generated. The minimum hash value for the set of chunks may be a feature ($F_0$, 650) that can be used to represent or describe the 1000 chunks. In some embodiments, the one or more fitting algorithms may be used to determine a minimum hash for each function of the two or more different hash functions. In some cases, each feature of the set of features may comprise the minimum hash for each hash function of the two or more different hash functions. The set of features may comprise a vector of the minimum hashes of the two or more different hash functions.

In some embodiments, the one or more fitting algorithms may be used to determine a maximum hash of the entire set of chunks or subset of chunks. A feature may correspond to the maximum hash value for the entire set of chunks or subset of chunks. In some cases, the maximum hash value may be used, additionally or alternatively with the minimum hash value for determining a set of features. In some cases, a feature vector may comprise one or more features generated from a minimum hash value and/or one or more features generated from a maximum hash value. In some cases, a feature may be a linear combination of one or more hashes generated by the one or more hashing algorithms for the one or more chunks.

One or more hashing algorithms may be employed to generate one or more features (e.g., $F_0, F_1, F_2, \ldots, F_i$), for example as shown in FIG. 6B. For example, a SHA-2 hashing algorithm may be used to generate 1000 SHA-2 hash values. The minimum hash value in the set of SHA-2 hash values may be used to generate a first feature ($F_0$). Then a MD2 hashing algorithm may be used to generate 1000 MD2 hash function values. The minimum hash value in the set of MD2 hash values may be used to generate a second feature ($F_1$). The features may be generated simultaneously or concurrently. The features may be stored in a database or as described elsewhere herein. By storing features instead of individual fingerprints of the chunks (e.g., all of the hash values), the magnitude of the data storage and memory requirements can be reduced. For example, for a segment comprising 1000 data chunks, 10 features may be capable of representing the entire segment (or the entire set of chunks). Instead of storing 1000 hash values for the 1000 individual data chunks, the system described herein may only need to store 10 features, thus enabling the memory storage to be reduced by three orders of magnitude. In some cases, the one or more features may be associated with one or more particular chunks in the set of chunks. For example, a particular chunk (e.g., chunk 1,1) may have a hash value that is the minimum hash value in the set.

As shown in FIG. 6B, the features may be combined to produce a feature vector 670. The features may be used to generate a sketch 680 (step 606). The sketch 680 can comprise the set of features. The sketch can comprise the one or more feature vectors. The sketch can be compared to one or more other sketches as described elsewhere herein. In some cases, the sketch may be computed using, for example, a spatiotemporal sketching algorithm, Count sketch, Count-min sketch, conservative update sketch, Count-Min-Log sketch, Slim-Fat sketch, or Weight-Median Sketch, etc. In some embodiments, the sketch may be generated using a resemblance hashing algorithm or similar function.

The sketch may be useable for inline deduplication of at least one other segment from an input data stream received from the one or more client applications. By using sketches for inline deduplication, reduction of large amounts of data (e.g. on a petabyte scale) can be accomplished. The sketch may be useable for inline deduplication without requiring a full index of the plurality of chunks. The sketch may be useable for inline deduplication without requiring a lookup of every chunk in the at least one other input data stream to the full index.

II. Sketch Comparison

Figure 7A:
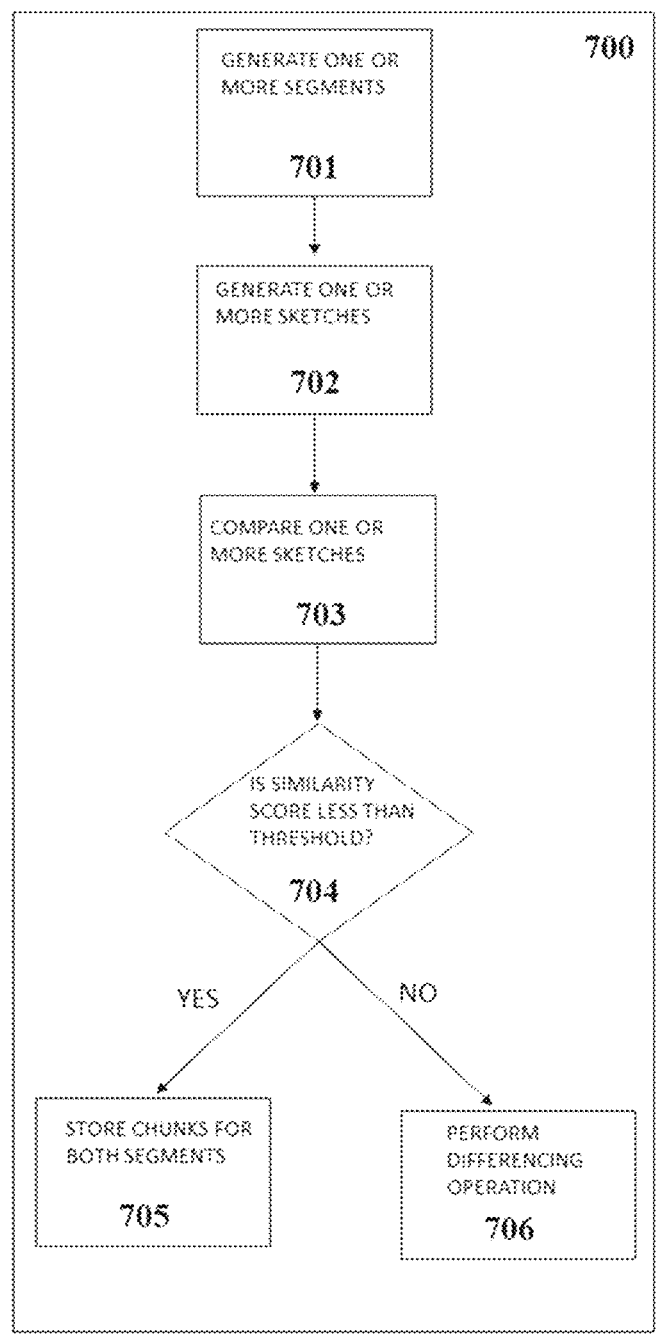
FIGS. 7A and 7B illustrate a flow diagram for comparing sketches, in accordance with some embodiments of the present disclosure.
Figure 7B:
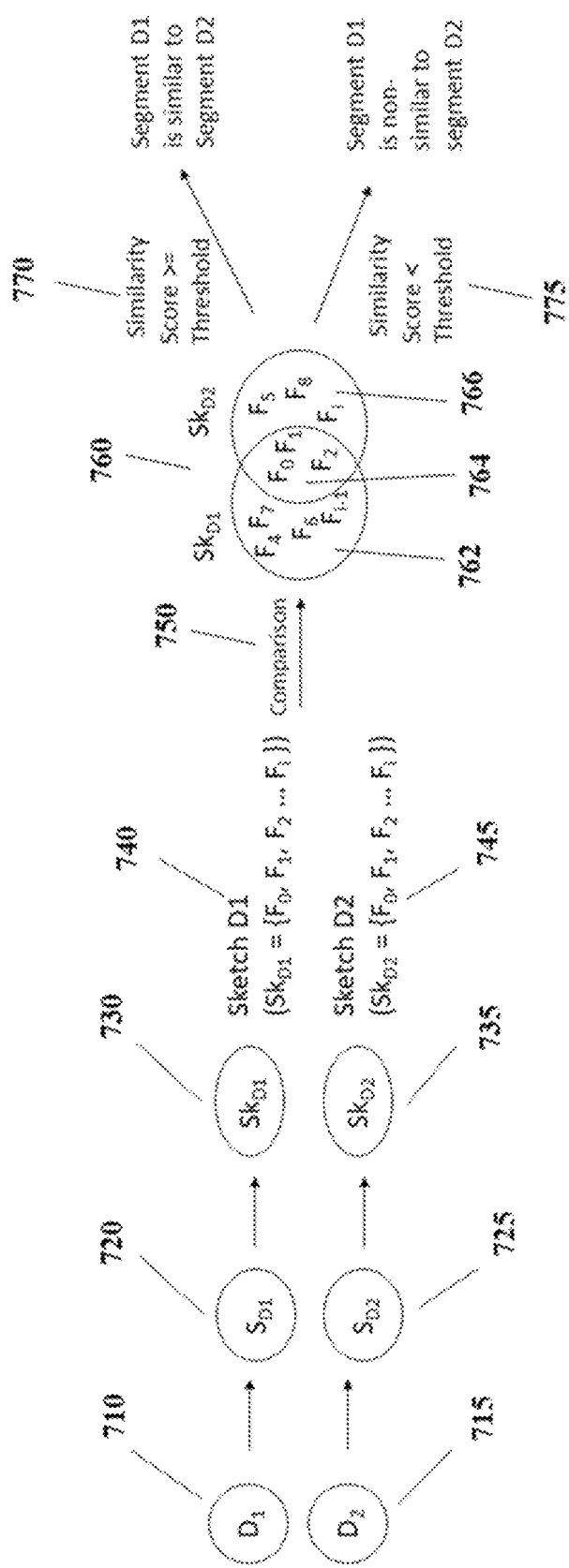

Sketch comparison may be performed using the sketch comparison module 700, for example as illustrated in FIG. 7A. The method may further comprise generating at least one other segment from the at least one other input data stream (step 701). FIG. 7B illustrates a first input data stream 710 and a second input data stream 715, that can be used to generate a first segment 720 and a second segment 725. In some cases, the first segment 720 and the second segment 725 may be generated from the same data input stream. The second segment 725 may be generated using the methods described elsewhere herein. The method may further comprise computing a sketch of the second segment (step 702). FIG. 7B illustrates the comparison of a sketch for the first segment 730 and a sketch of the second segment 745 (step 703). The sketch for the second segment may be computed as described elsewhere herein. The sketch for the second segment may comprise another set of features (e.g., characteristics) that are representative of or unique to the second segment. FIG. 7B illustrates that the sketch 730 for the first segment may comprise a set of features 740 and that the sketch 735 for the second segment may also comprise a set of features 745. The features above may be generated as described elsewhere herein.

The method may further comprise processing the first sketch and the second sketch, based at least in part on a similarity score to determine whether the second segment is probabilistically similar to the first segment (step 704). The processing may comprise comparing the first set of features with the second set of features, to determine whether one or more features are common to both sets. As shown in FIG. 7B, the sketch 730 of the first segment and the sketch 735 of the second segment may be compared 750 to determine features that are in both sets 764 and/or features that may not shared by both sets (762, 766). Each sketch can comprise a different number of features. For example, sketch 730 may comprise 10 features while sketch 735 may comprise 6 features. Each sketch can comprise the same number of features. For example, sketch 730 may comprise 10 features while sketch 735 may comprise 10 features.

The second segment may be determined to be probabilistically similar to the first segment when the similarity score is greater than or equal to a similarity threshold. The second segment may be determined to be probabilistically non-similar to the first segment when the similarity score is less than a similarity threshold. As illustrated in FIG. 7B, if the similarity score is greater than or equal to a threshold 770, the first segment and the second segment may be considered to be similar. In some cases, if the first segment and the second segment are considered to be similar, the method may further comprise performing a differencing operation. The differencing operation may be as described elsewhere herein. If the similarity score is less than or a threshold 775, the first segment and the second segment may be considered to be non-similar. In some cases, if the first segment and the second segment may be considered to be non-similar, the one or more chunks of the second segment may be stored in a database (step 705). The similarity threshold may be at least about 5%, 10%, 15%, 20%, 25%, 30%, 35%, 40%, 50%, 55%, 60%, 65%, 70%, 75%, 80%, 85%, 90%, 95%, 99%, or more. The similarity score threshold may be from about 5% to 99%, 10% to 90%, 20% to 80%, 30% to 70%, or 40% to 50%. In some embodiments, the similarity threshold may be at least about 50%.

The similarity score may be indicative of a degree of overlap between the first segment and the second segment. In some cases, for example, if the first segment has 10 features, and the second segment has 8 features, and 6 features are found to match in both sets, the similarity score may be 50% (e.g., 6 matching features/12 unique features). In some cases, the similarity score may be calculated relative to a particular segment. For example, if the first segment has 10 features, and the second segment has 8 features, and 6 features are found to match in both sets, the similarity score may be 6/10 (i.e., 60%) or 6/8 (i.e., 75%), respectively. In some cases, the number of features for the sketch of the first segment and the number of features for the sketch of the second segment may be the same. In some cases, the number of features for the sketch of the first segment and the number of features for the sketch of the second segment may be different.

The similarity score may be indicative of the number of matching features between the first segment and the second segment. As shown in FIG. 7B, the features that match 764 may be found in both sketches. One or more features may be similar or identical both sets. One or more features may not be shared by or common to both sets. One or more features may be a combination of matching and non-matching features between the first segment and the second segment. The second segment may be of a same size as the first segment. The second segment may be of a different size than the first segment. Each of the first segment and the second segment may have a size ranging from about 1 megabyte (MB) to about 4 MB. Each of the first segment and the second segment may have a size ranging as described elsewhere herein.

III. Differencing Operation

Figure 8A:
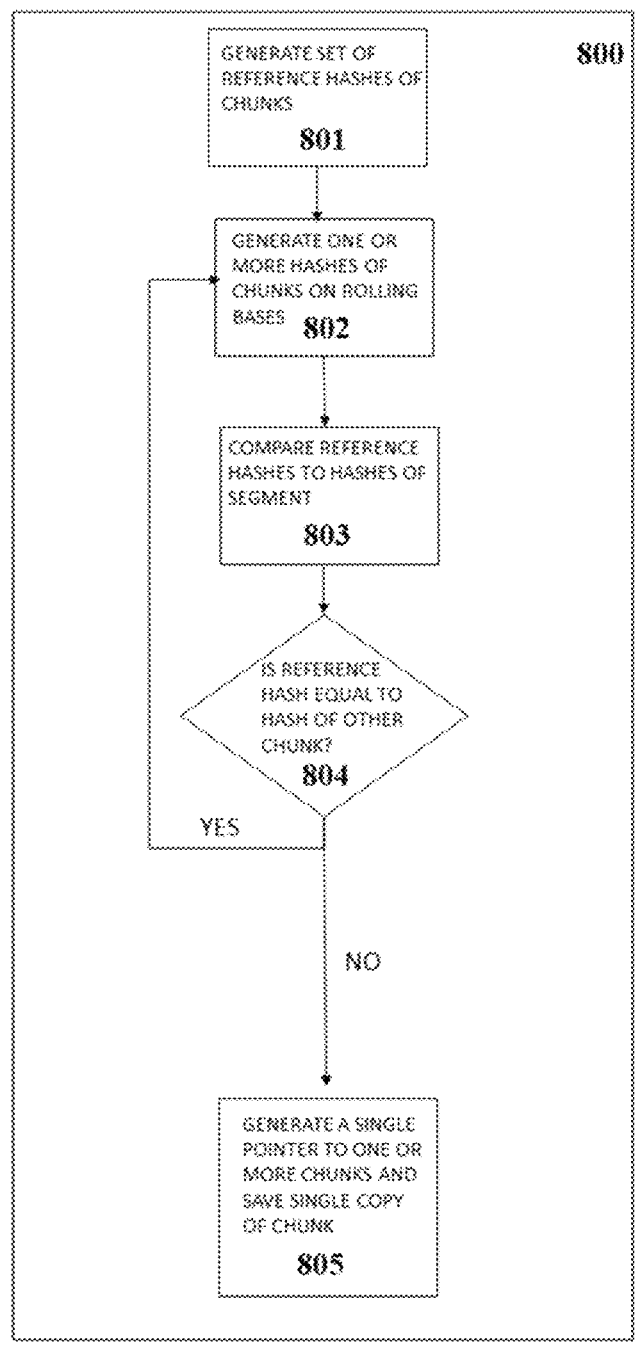
FIGS. 8A, 8B, 8C, 8D, and 8E illustrate a flow diagram for performing a differencing operation, in accordance with some embodiments of the present disclosure.
Figure 8B:
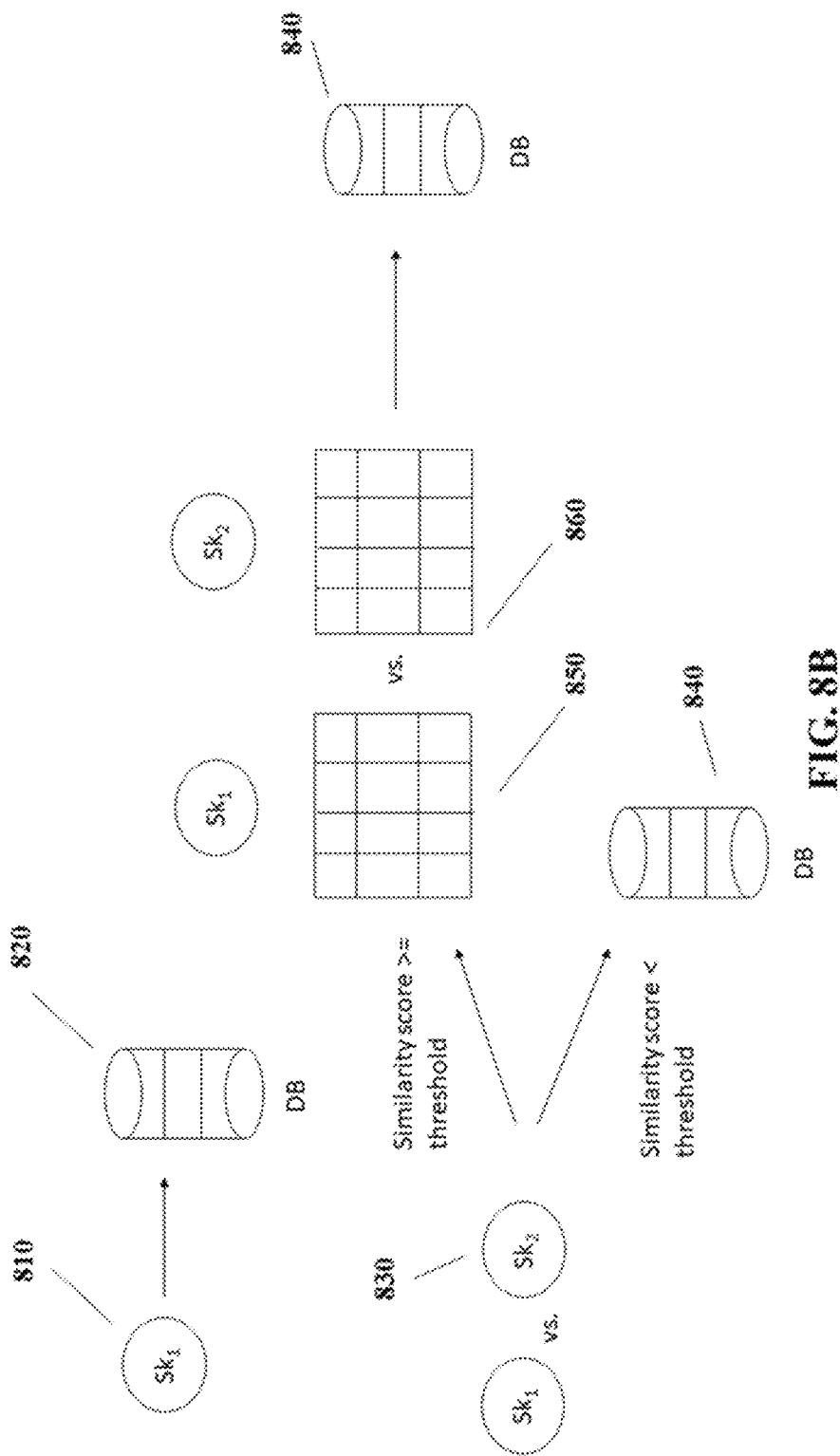

A data differencing operation may be performed using the differencing operation module 800 and illustrated for example in FIG. 8A. The method may further comprise storing the first segment and the features of the second segment in a database. As shown in FIG. 8B, the sketch of the segment (e.g., the set of features of the segment, 810) and the chunks that correspond to the sketch may be stored in a database (820, 840). The method may further comprise storing the second segment and its set of features (e.g., sketch, 830) in a database when the similarity score is less than a similarity threshold. For example, if the similarity score between sketch and the another sketch is 15%, and the threshold value is set to 40%, the second segment and its set of features can be stored in the database. As shown in FIG. 8B, when two sketches are compared (e.g., 810 vs 830) and the similarity score is below a threshold value, the features of the sketch and the chunks that correspond to that segment may be stored in the database 840. In some cases, the databases may be the same. In some cases, the databases may be different.

Figure 8C:
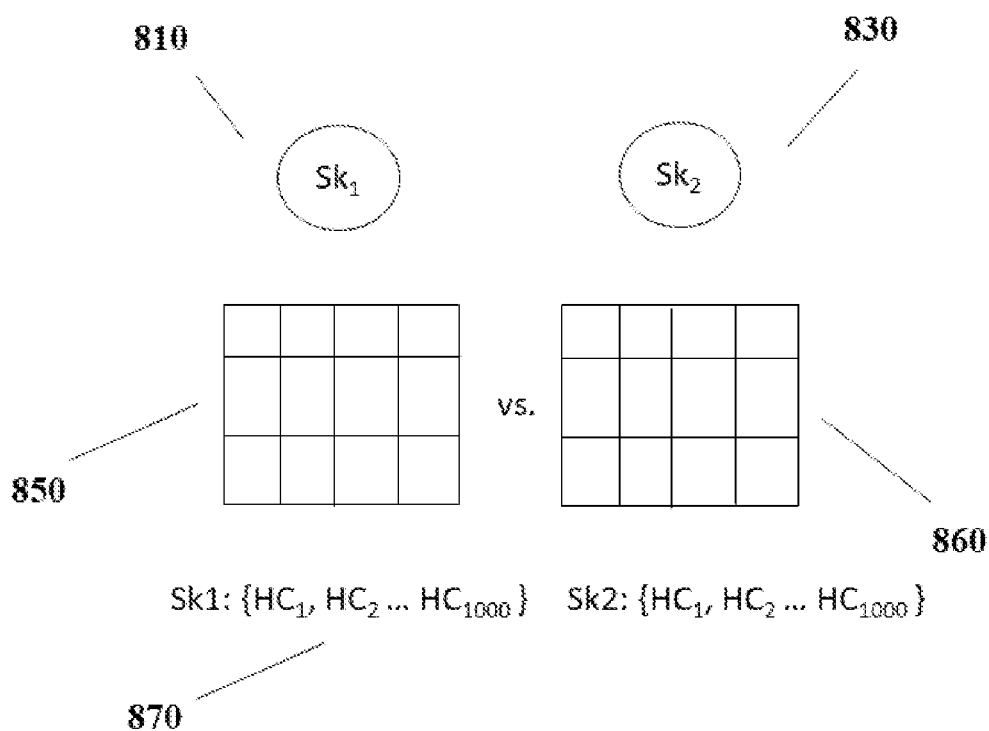

The method may further comprise performing a differencing operation on the second segment to the first segment when the similarity score is greater than or equal to the similarity threshold. For example, if the similarity score between a sketch and another sketch is 65%, and the threshold value is set to 40%, the chunks of the first segment and the chunks of the second segment may be differenced. As shown in FIG. 8C, when the similarity score of the first segment and the second segment is greater than or equal to a threshold, the individual chunks of both segments can be compared (e.g., 850 vs 860). The differencing operation may comprise generating a reference set of hashes (870) for the plurality of chunks of the first segment (step 801). The hashes of the plurality of chunks of the first segment may be generated (step 802) using one or more hashing algorithms as described elsewhere herein. The hashes of the plurality of chunks may be previously generated hashes. The method may comprise storing the reference set of hashes in a memory table.

The reference set of hashes may comprise weak hashes and/or strong hashes. The strength of the hash may be dependent on the hashing algorithm. A weak hashing algorithm may generate one or more weak hashes. A strong hashing algorithm may generate one or more strong hashes. The weak hashes and/or strong hashes may be generated using one or more hashing algorithms described elsewhere herein. A weak hashing algorithm may be a hashing algorithm with a weak collision resistance. A weak collision resistance may indicate that the probability of failing to find a collision is not negligible. A strong hashing algorithm may be a hashing algorithm with a strong collision resistance. A strong collision resistance may indicate that the probability of failing to find a collision is negligible. A strong hashing algorithm may make it difficult to find an input that maps to the same hash value. A weak hashing algorithm may make it easier than a strong hashing algorithm to find an input that maps to the same hash value. A weak hashing algorithm may be more likely to cluster hash values (e.g., mapping of keys to the same hash value) than a strong hash function. A strong hash function may have a uniform distribution of hash values.

The strength (e.g., weak to strong) of a hashing algorithm may be on a gradient scale. The strength of a hashing algorithm may be dependent on the time scale of using the hashing algorithm, the complexity of the hashing algorithm, the implementation of the hashing algorithm, central processing unit benchmarks, or cycles per byte, etc. The strength of a hashing algorithm may be determined using one or more statistical tests. The one or more statistical tests may measure, for example, whether the hash function can be readily distinguished from a random function. A test may be, for example, to determine whether the hash function displays the avalanche effect. The avalanche effect may be an effect where any single-bit change in the input key should affect on average half the bits in the output.

A weak hashing algorithm may maximize the number of data chunks hashed per unit of time. A weak hashing algorithm may maximize the number of data chunks hashed per unit of time at the cost of decreasing the total number of collisions of hashed data chunks. Collisions may be when a hashing algorithm produces the same hash value for different data chunks. A strong hashing algorithm may minimize the total number of collisions of hashed data chunks. A strong hashing algorithm may minimize the total number of collisions of hashed data chunks at the cost of maximizing the number of hashed data chunks hashed per unit of time. Collisions may be when a hashing algorithm produces the same hash value for different data chunks.

The reference set of hashes may be generated using a high throughput hashing function having a throughput on at least a gigabyte scale. In some cases, the high throughput hashing function may be a weak hashing algorithm. The hashing algorithm may be a hashing algorithm as described elsewhere herein. The degree of similarity between the two sketches/segments may determine the strength of the hashing algorithm used for the high throughput hashing function. For example, if the two sketches/segments have a certain similarity score, a particular hashing algorithm may be selected over another hashing algorithm. For instance, if the similarity score is considered to be high between two sketches of two segments, a weak hashing function may be employed. A weak hashing function may be employed as the sketch comparison may be a first order approximation in quantifying similarity (e.g., the sketch may assist in determining that two segments are similar, and as a result, a weak hash may be used). Conversely, a strong hashing function may be employed when the similarity score for the set of features between the two segments is low. In some cases, a hashing function may not be employed if the two sketches have a low similarity score.

In some embodiments, a first hashing algorithm may be used if the similarity score is between a range of, for example, 70% to 90%. In some cases, if the similarity score is greater than, for example, 90%, the method may use a second hashing function that is different from the first hash function. If the similarity score is less than, for example, 70% but greater than 50%, the method may use a third hashing function. If the similarity is below, for example, 50%, the method may not use a hashing algorithm and may instead store the two sketches (e.g., features) and the two segments in a database. In some cases, the benefits of differencing two segments may be marginal if the two segments are considered to be substantially non-similar after comparing the sketches of the two segments.

In some cases, a variety of one or more parameters may be altered to assist the hashing function to maximize the hashing throughput capacity. For example, the parameters may be used to, decrease the number of clock cycles needed to produce a hash value, adjust the hash value memory foot-print, or the data word size, etc. The hash may be computed iteratively. The hash may be computed iteratively by adjusting the byte size given to the hashing algorithm. The byte size may be at least about 1 byte, 2 bytes, 4 bytes, 8 bytes, 16 bytes, 32 bytes, 64 bytes, or more. The byte size may be at most about 64 bytes, 32 bytes, 16 bytes, 8 bytes, 4 bytes, 2 bytes, 1 byte, or less. The byte size may be from about 1 byte to 64 bytes, 1 byte to 16 bytes, or 1 byte to 4 bytes.

In some embodiments, the performance of a hashing algorithm for high throughput hash value generation may be dependent on the data size (e.g., gigabyte) of the throughput. The performance of a hashing algorithm may be dependent on the speed of the throughput of the data (e.g., gigabyte per second) for hash value generation. The performance of a hashing algorithm may be dependent on the strength of the hashing algorithm. For example, a weak hashing algorithm may lead to improved performance if quicker hash value generation is desired as a weak hashing function generally produces hash values quicker than a strong hashing function.

Figure 8D:
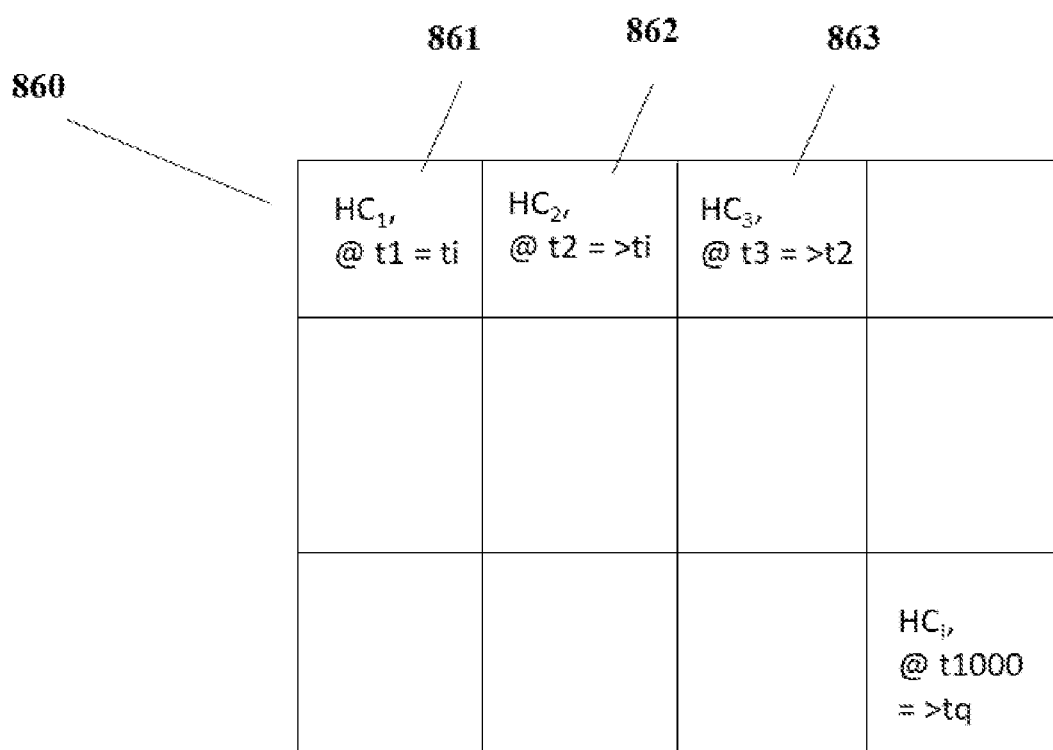

In some embodiments, the differencing operation may further comprise generating, on a sequential rolling basis, a hash for a chunk of the plurality of chunks of the second segment. For example, the hash values for 1000 chunks may be generated by generating a first hash value for a first chunk, then a second hash value for a second chunk at a later time, until 1000 hash values have been generated or a subset of 1000 hash values are generated. As shown in FIG. 8D, the hash value of a chunk in the second segment may be computed ($HC_1$, 861) at an initial time (e.g., t1). The second hash value of a chunk ($HC_2$, 862) in the second segment may be computed at time after t1 (e.g., t2). The chunks may be adjacent to each other. Alternatively, the chunks need not be consecutive chunks (e.g., 861 vs 863). In some cases, the hash may be compared to the reference set of hashes to determine if there is a match, before generating another hash for a next chunk of the plurality of chunks of the second segment. In some cases, all hashes for the plurality of chunks of the second segment may be generated concurrently.

The differencing operation may further comprise comparing the hash to the reference set of hashes to determine if there is a match (step 803). The differencing operation may further comprise continuing to generate one or more other hashes for one or more subsequent chunks of the plurality of chunks, as long as the hash and the one or more other hashes find a match from the reference set of hashes (steps 802-804). The differencing operation may further comprise generating and storing a single pointer referencing to the chunk and the one or more subsequent chunks, upon detecting that a hash for a follow-on chunk does not find a match from the reference set of hashes (step 805). The hashes may be weak hashes as described elsewhere herein.

Figure 8E:
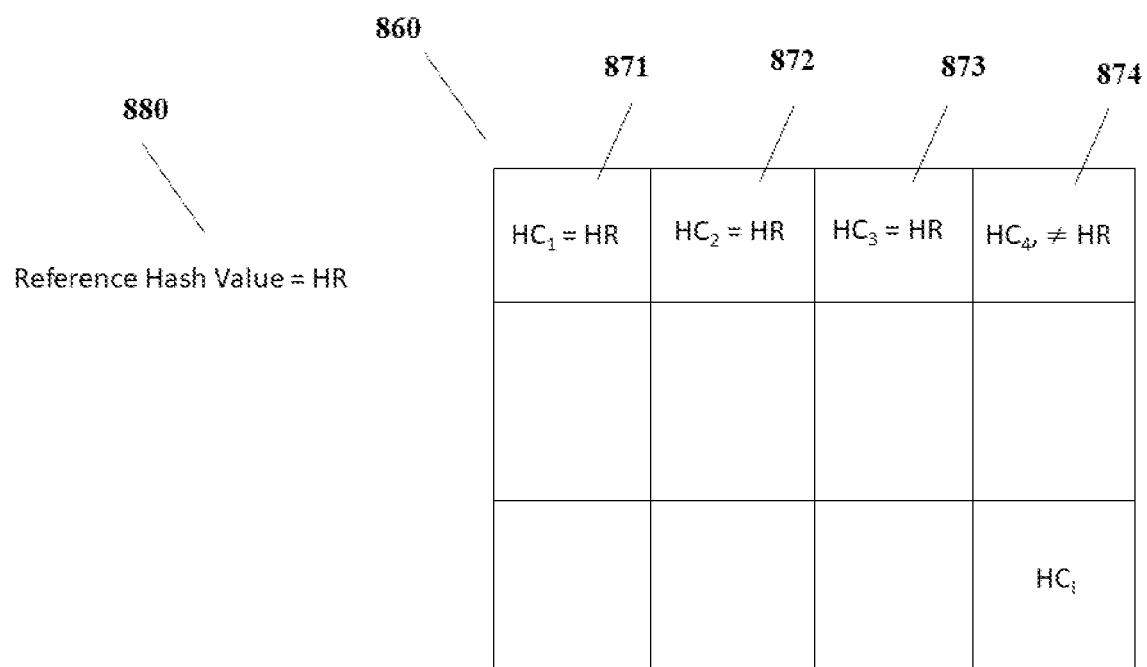

As shown in FIG. 8E, the second segment 860 may comprise a plurality of chunks that may be in sequential order. The first hash value 871 may be compared to a reference hash value 880. The reference hash may be a hash generated from any segment prior to the hashing of a later segment. The reference hash may be a hash from the first segment. The reference hash may be a hash stored in a database. The reference hash value may be equivalent to the first hash value. In some cases, instead of generating a pointer at this point in time, the sequential chunk may be examined. If the sequential chunk (e.g., 872) has the same hash value as the reference hash value, the method may comprise continuing to check the hash value of each chunk (e.g., 871 to 874) until there is a mismatch (e.g., the hash value does not match the reference hash value, 874). At this point in time, a pointer may be stored referencing to each subsequent chunk (871 to 873). Storing pointers following sequential chunk analysis can lead to improved computation speeds as less pointers may need to be accessed, in addition to a decrease in memory usage as fewer pointers may need to be stored.

The differencing operation may be performed inline as one or more input data streams are received from the one or more client applications. In some alternative embodiments, the differencing operation may be performed offline. For example, the differencing operation may be performed offline after one or more segments have been stored in a database. The differencing operation may be used to reduce the first segment and the second segment into a plurality of homogenous fragments. The plurality of homogenous fragments may be stored in one or more cloud object stores. The differencing operation may be used to produce a sparse index comprising a reduced set of pointers. The reduced set of pointers may comprise a single pointer referencing to a series of sequential chunks. The use of homogenous fragments can reduce memory storage requirements as fewer chunks need to be stored after the differencing operation.

IV. Data Reconstruction

Figure 9:
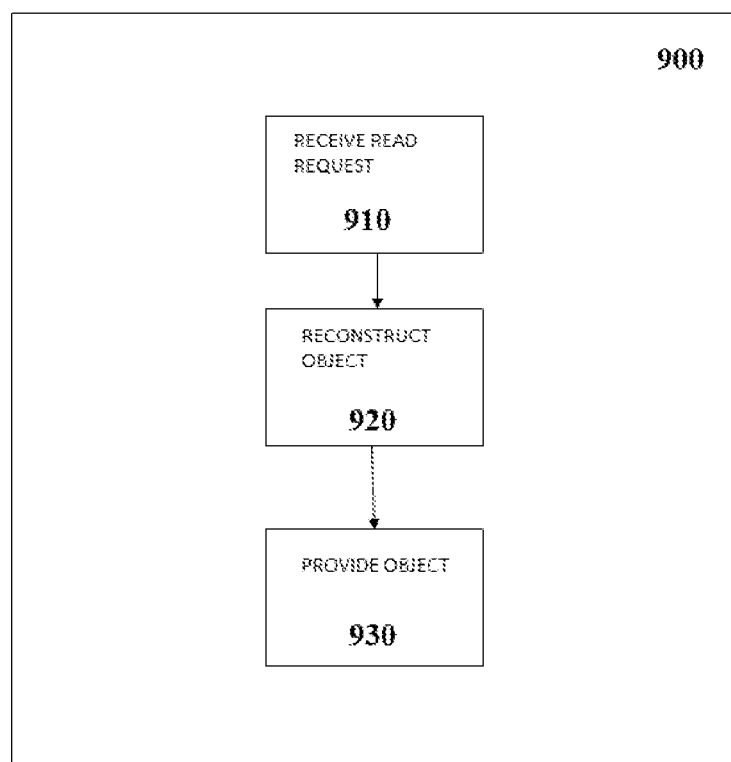
FIG. 9 illustrates a flow diagram for data reconstruction, in accordance with some embodiments of the present disclosure.

Reconstruction of data from the homogenous fragments may be performed using a data reconstruction module 900, for example as illustrated in FIG. 9A. The method may further comprise receiving a read request from the one or more client applications (step 910). The read request may be for an object comprising the first segment and/or the second segment. The method may further comprise reconstructing the first and/or the second segment using at least in part the plurality of homogenous fragments and the sparse index, to generate the object in response to the read request (step 920). The homogenous fragments may comprise one or more data chunks as described elsewhere herein.

The method may further comprise providing the reconstructed object to the one or more client applications (step 930). The read request may utilize the sparse array index to quickly reconstruct or reconstitute the object. The sparse index array may point to each homogenous fragment to reconstruct the object requested by the client application. The data reconstruction module may save processing time and computational power, since the object can be reconstructed using the sparse index and homogenous fragments (e.g., collection of chunks) as opposed to all of the individual chunks.

V. Data Chunking

The input data stream described herein may be segmented into variably sized segments. The segments of the data stream may be determined by pre-chunking the data stream into a set of chunks that may be assembled into one of segments. Each segment may be deduplicated without wasting of extra space. A deduplication chunk algorithm may be used to generate segments that may include a whole number of chunks. For example, a sliding window analysis of the data stream may be used to identify chunks by finding natural breaks in the data stream to support 4 kilobytes (kB)-16 kB chunks. In this example, the natural breaks may be generated by computing a hash of a 16-byte region and determining if that hash has a pattern that has the last 13 bits in the pattern as zeroes. The chunks may be further assembled into a segment within a target range (e.g., 1 megabyte (MB) to 8 MB, 2 MB to 16 MB, or some other range).

FIG. 1 is a block diagram of a data chunking module 100 that may be used for deduplicating data before storing the data. In FIG. 1, the data chunking module 100 may include data storage 110 that may be used to store the deduplicated chunks (e.g., chunks 104A, 104C, and 104D). The data storage 110 may be any type of data storage system that can deduplicate and/or store data (e.g., a storage system including a hard disk drive, sold state drive, memory, optical drive, tape drive, and/or another type of system capable of storing data; a distributed storage system; a cloud storage system; and/or another type of storage system). The data storage system may be a physical or virtual data storage system.

To deduplicate the data stream 108, the data chunking module 100 may break up the data stream 108 into a set of data blocks 102A-C. For example, three data blocks 102A-B are illustrated, in alternate embodiments, there can be more or less data blocks 102A-C. The size of the data blocks can range from 1 MB to 16 MB (e.g., range of 1 MB to 8 MB, 2 MB to 16 MB, or some other range), the data block size may be larger or smaller. In some cases, the data blocks may be evenly split, where each data block 102A-C may have the same fixed size.

The deduplication component 106 may deduplicate the data blocks 102A-C by partitioning each data block into smaller chunks 104A-E and determines if each of the chunks 104A-E may be currently stored in the data storage 110. For example, for each of the chunks 104A-E, the system 110 may compute a fingerprint of that chunk 104A-E. In this embodiment, the fingerprint may be a mechanism used to uniquely identify each chunk 104A-E. The fingerprint can be a cryptographic hash function, as one of the secure hashing algorithms (SHA) (e.g., SHA-1, SHA-256, etc. and/or another type of cryptographic hash functions). The fingerprint for each of the chunks 104A-E may uniquely identify the chunk 104A-E (assuming there are no data collisions in the fingerprint computation). The fingerprint may be used to determine whether one of the chunks 104A-E is currently stored in the data storage 110. The system 110 may store the chunk fingerprints in a database. For each chunk 104A-E that may be stored, the data chunking module 100 may compute a fingerprint for a chunk (e.g., chunk 104A) and may determine if that fingerprint exists in the fingerprint database. If the newly computed fingerprint is not in the database, the system 100 may store the corresponding chunk. If the chunk fingerprint matches one of the fingerprints in the database, then a copy of this chunk may be currently stored in the data storage 110. In this case, the system 100 may not store the chunk. Instead, the system may increment a count of the number of references to this chunk in the data storage and may store a reference to that chunk. The reference count may be used to determine when that chunk can be deleted from the data storage 110. As illustrated in FIG. 1, because chunks 104A, 104C, and 104D are currently stored in the data storage 110, system 100 may store chunk 104B and 104E for the data block 102A. Because data block 104A, 104C, and 104D may be already stored in the data storage system 110. As a result, the system 100 may not store those chunks. In some cases, the data storage system may exist outside of the data chunking module 100.

As described in FIG. 1, the data chunking module 100 may partition each data block into smaller chunks and may perform the deduplication analysis at the chunk level. The data chunking module 100 may partition a data block into equal sized chunks. However, this may lead to a poor determination of duplicate data as variably-sized objects in the data stream 102 may be haphazardly divided into random chunks. Alternatively, the data chunking module 100 may divide the data blocks into variably sized chunks with a more natural break, so as to find different objects in the data stream. This may increase the likelihood of finding duplicate chunks in the data stream. In some cases, a problem may occur, however, because if the system determines variably-sized chunks from fixed-sized data blocks, there may be a likelihood of having an extra chunk of data.

Figure 2:
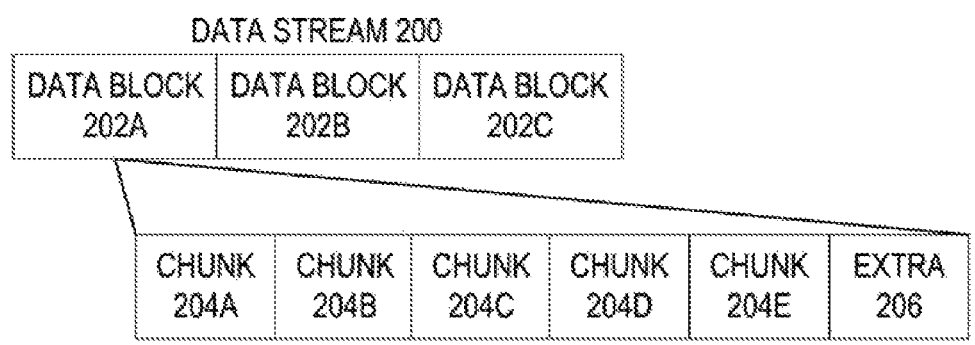
FIG. 2 illustrates pre-chunking a data stream into a set of data blocks and chunks, in accordance with some embodiments of the present disclosure.

FIG. 2 is a block diagram of pre-chunking a data stream 200 into a set of data blocks and chunks. In FIG. 2, a data stream 200 may be divided into fixed-sized data blocks 202A-C (e.g., 1 MB). As per above, there may be more or less than three data blocks 202A-C for a data stream 200. For data block 202A, the system may partition the data block 202A into chunks 204A-E. Because the chunks may be variably sized (e.g. between 4 kB to 16 kB), there may be a possibility that there is an extra partition of data that does not fit a chunk definition. The system may chunk data block 2020A into chunks 204A-E, where there may be an extra chunk of data 206 that does not fit into the partitioning algorithm being used by the system. For example, the system may use a sliding window to find 4-16 kB sized chunks 204A-E by examining a sliding window of 16 bytes in the data block 202A-C and may look for a pattern that has the last 13 bits in the pattern as zeroes. This, however, may leave an extra chunk 206 that does not fit within the pattern above. A consequence of this may be that this data could be wasted as it is unlikely that another chunk will have the same fingerprint as a fingerprint of the extra chunk 206. The extra chunk 206 would be stored as a separate chunk that may be unlikely to have a duplicate. While this may not be much of a problem for smaller chunk sizes, as chunk sizes (and possibly data block sizes) get larger, the potential for data wastage may grow.

In some embodiments, a workaround for this may be to examine the beginning of the next data block for chunks that include the extra chunk 206. For example, the extra chunk 206 may be analyzed in conjunction with the beginning of the next data block, data block 202B. Examining the next data block may serialize the pre-chunking process, which may inhibit a parallelization of the overall deduplication process.

In some embodiments, instead of having fixed sized data blocks, the system may pre-chunk a data stream into variably-sized segments using the same or similar criteria as used to chunk a data block into multiple chunks. The system may analyze the data stream for chunks using the same or similar criteria that is used to chunk the data for the deduplication operation. Once the system may have enough chunks to include an amount of data that is within a range for a segment (e.g., a range of 1 MB to 8 MB, 2 MB to 16 MB, or some other range), the system may duplicate this segment. By performing this pre-chunking, the system may create segments that may be chunked without having an extra chunk as described in FIG. 2 above. This may reduce wastage and may increase parallelization.

VI. Data Segmenting

Figure 3:
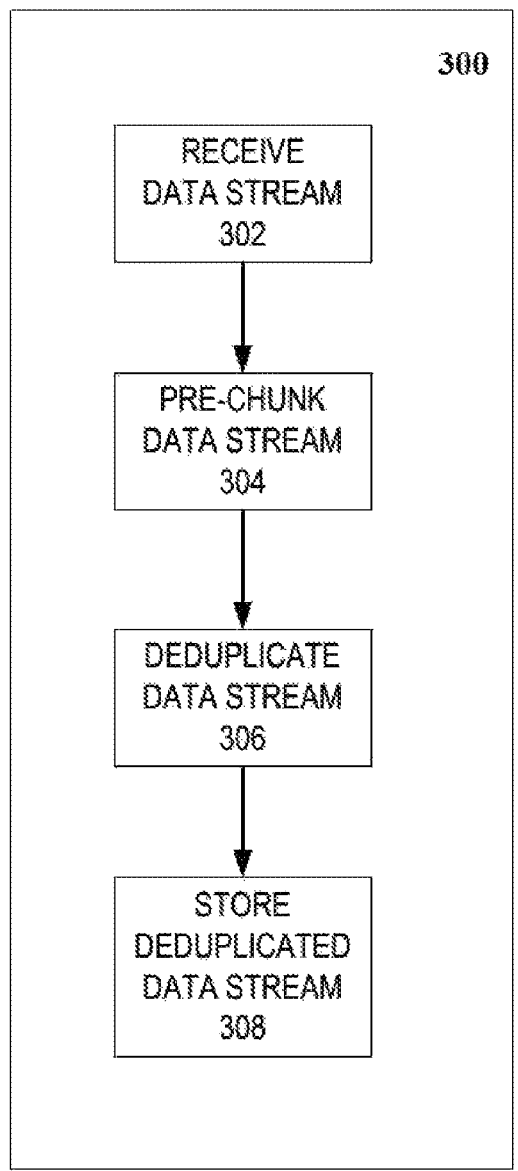
FIG. 3 illustrates a flow diagram for segmenting a data stream, in accordance with some embodiments of the present disclosure.

FIG. 3 is a flow diagram of a segmenting module 300 configured to segment a data stream. In FIG. 3, the segmenting module 300 may begin by receiving a data stream at block 302. The data stream may be a file or another type of object that can be deduplicated. At block 302, the segmenting module 300 may pre-chunk the data stream to create segments of chunks. The segments may include multiple clunks with no extras chunks. In some cases, the segmenting module 300 may pre-chunk the data stream using the same or similar criteria as the deduplication process for chunking a data block. Pre-chunking may be further described in FIG. 4 and FIG. 5 below. The segmenting module 300 may deduplicate the data stream using the segments at block 306. The deduplication may be done serially or in parallel as the segments will not have any extra chunks for deduplication. The segmenting module 300 may chunk each of the segments and may perform deduplication on these chunks. For example, for each chunk, the segmenting module 300 may compute a fingerprint for each chunk and this fingerprint may be used to determine whether this chunk is currently stored in the data storage. The segmenting module 300 may store the chunk fingerprints in a database. For each chunk to be stored, the segmenting module 300 may compute a fingerprint for the chunk and may determine if that fingerprint exists in the fingerprint database. If the newly computed fingerprint is not in the database, the segmenting module 300 may store the corresponding chunk. If the chunk fingerprint matches one of the fingerprints in the database, then a copy of this chunk may be stored in the data storage. At block 308, the process may store the deduplication data stream. The deduplicated data stream may include the unique chunks that are not currently stored in the data storage. The segmenting module 300 may store the deduplicated data stream as the data stream is being written or can be done after the initial storage (e.g., deduplicated in the background).

Figure 4:
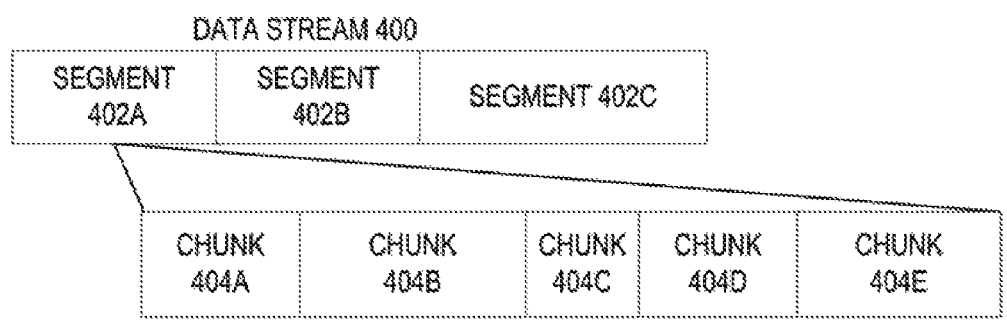
FIG. 4 illustrates pre-chunking a data stream into a set of variable-sized segments and chunks, in accordance with some embodiments of the present disclosure.

As described above, the segmenting module 300 may pre-chunk the data stream into a set of segments that are ready for the deduplication process. FIG. 4 is a block diagram of pre-chunking a data stream 400 into a set of variable-sized data blocks and chunks. In FIG. 4, the data stream 400 may be pre-chunked into variable sized segments. Each of the segments may be a whole number of chunks (e.g., where there is not an extra chunk as illustrated in the FIG. 2 above). For example, segment 402A, which is smaller than segments 402B or 402C, may include chunks 404A-E. In some cases, the chunks 404A-E may be variably-sized, where there is not extra chunk that is part of the segment 402A. Segment 402A may be illustrated as being a smaller segment than segments 402B or 402C. in some cases, the segment 402A may not necessarily smaller than other data segments (e. g., can be larger than one, some or all of the segments, the same size as another segment, etc.).

VII. Variable Segment Sizing

Figure 5:
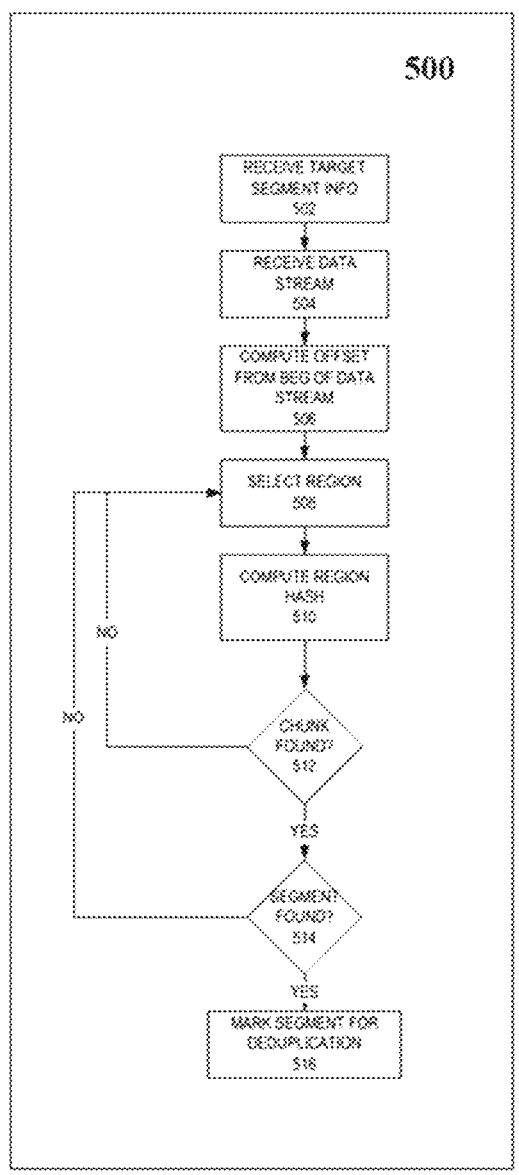
FIG. 5 illustrates a flow diagram for determining variable-sized segments, in accordance with some embodiments of the present disclosure.

FIG. 5 is a flow diagram of a variable segment sizing module 500 which may determine variable-sized segments for deduplication. In FIG. 5, the variable segment sizing module 500 may begin by receiving target segment information at block 502. The target segment information may have a range of bytes that can be used for determining the variably sized segments. For example, the target segment range may be from 1 MB to 8 MB, 2 MG to 16 MB, or some other range. At block 504, step 500 may receive the data stream. The data stream may be a file or another object that can be stored in the data storage.

The variable segment sizing module 500 may compute an offset from the beginning of the data steam at block 506. The variable segment sizing module 500 may compute an offset that may be within a 4 kB to 16 kB range that may be used to find chunks. For example, the variable segment sizing module 500 may randomly compute an offset that may be within 4 kB 16 kB range from the beginning of the data stream. At block 508, may select a region for an analysis. The variable segment sizing module 500 may select a 16-byte region to determine if there is a natural break in the data stream. Step 500 may compute a region hash at block 510. The variable segment sizing module 500 may use a rolling hash to compute the region hash (e.g., Rabin-Karp, Rabin fingerprint, Cyclic fingerprint, Addler rolling hash, and/or some other type of rolling hash). The variable segment sizing module 500 may use a hash function algorithm as described elsewhere herein. The variable segment sizing module 500 may compute this hash as a way to determine if there is a natural break in the in the data stream. At block 512, the variable segment sizing module 500 may determine if a chunk found. The variable segment sizing module 500 may determine if there is a chunk by determining that the hash computed for the 16-byte region has at least 13 of the last bits of the hash are zero. The variable segment sizing module 500 may use different criteria for determining if a chunk is found (e.g., different number of zeros, a different pattern, etc.). If a chunk is found, execution may proceed to block 514. If a chunk is not found, execution may proceed to block 508, where a new region may be selected by advancing the window in the data stream for analysis.

At block 514, the variable segment sizing module 500 may determine if a segment is found. The variable segment sizing module 500 may determine, is a segment found, by summing up the lengths of the chunks as may be determined by variable segment sizing module 500 for those that are not currently part of an identified segment. If the sum of these lengths is within the target segment size range, the variable segment sizing module 500 may determine that a new segment has been found and execution may proceed to block 516. If a segment is not found, execution may proceed to block 508, where a new region may be selected by advancing the window in the data stream for analysis for a new chunk. At block 518, the variable segment sizing module 500 may mark the segment for deduplication. The variable segment sizing module 500 may mark this segment for deduplication, where the segment may be later deduplicated.

Computer Systems

Figure 12:
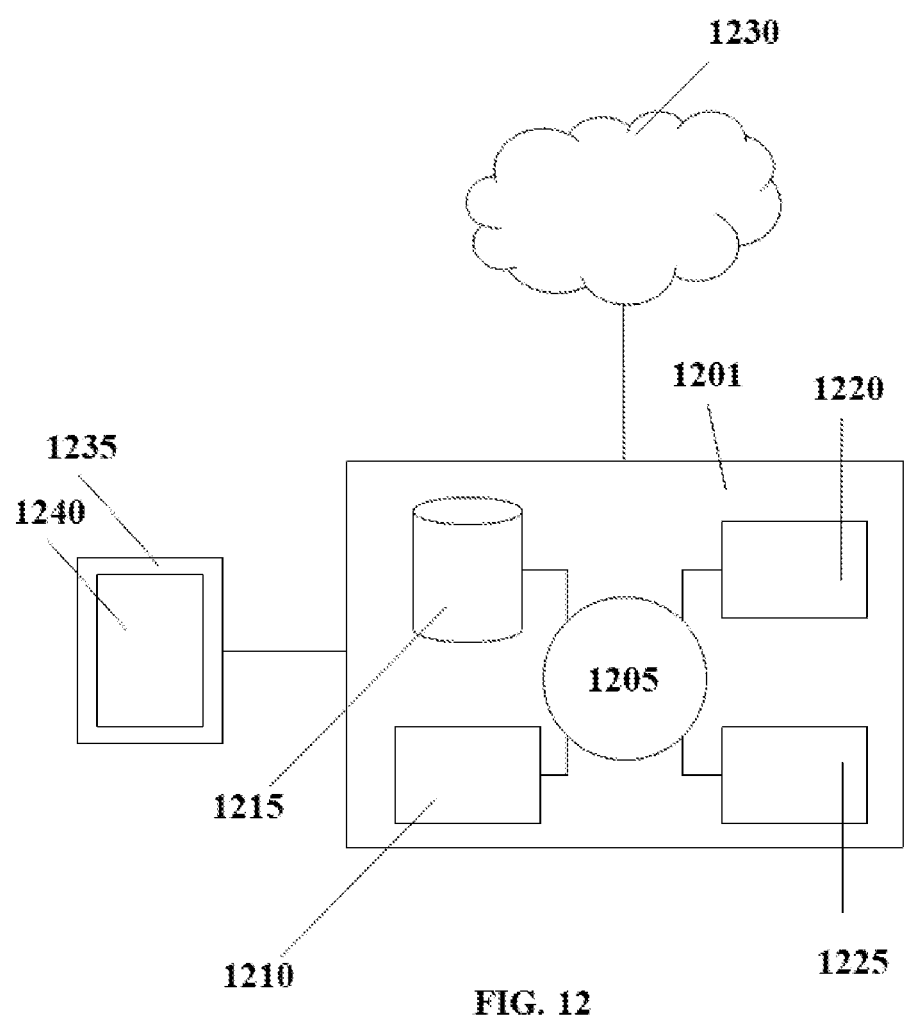
FIG. 12 shows a computer system that is programmed or otherwise configured to implement methods provided herein.

The present disclosure provides computer systems that are programmed to implement methods of the disclosure. FIG. 12 shows a computer system 1201 that is programmed or otherwise configured to intake an input data stream, generate one or more segments from the input data stream, produce hash values for one or more chunks of the one or more segments, produce features from the one or more hash values, compute a sketch of the one or more segments, compare one or more sketches of the one or more segments from the one or more input data streams, difference the one or more segments, store one or more chunks in a database, reduce data duplication, and reconstruct data from one or more read requests. The computer system 1201 can regulate various aspects of sketch computation, sketch comparison, segment differencing, and data reconstruction of the present disclosure, such as, for example, the hashing algorithms for producing hash values for the one or more chunks may be regulated to obtain different features for the sketch computation and sketch comparison. The computer system 1201 can be an electronic device of a user or a computer system that is remotely located with respect to the electronic device. The electronic device can be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, the hashing algorithms for feature determination of the plurality of chunks for sketching. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, produce a minimum hash value from a set of hash values for a plurality of chunks.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for inline data deduplication using sketch computation, comprising:
    receiving a first input data stream and a second input data stream from one or more client applications over a computer network;
    applying, using at least one computer processor, a hash function to: (i) the first input data stream to identify locate one or more natural breaks in the first input data stream for generating a to identify a first plurality of chunks, and (ii) the second input data stream to locate one or more other natural breaks in the second input data stream to identify a second plurality of chunks;
    assembling the first plurality of chunks based on a sum of the lengths of the first plurality of chunks and a target segment size range to form a first segment;
    assembling the second plurality of chunks based on a sum of the lengths of the second plurality of chunks and the target segment size range to form a second segment;
    computing a first sketch associated with the first segment and a second sketch associated with the second segment, wherein the first sketch comprises a first set of features that are representative of the first segment or unique to the first segment, wherein the second sketch comprises a second set of features that are representative of the second segment or unique to the second segment, and wherein the first set of features or the second set of features are useable to uniquely identify or distinguish the first segment from the second segment; and
    using the first sketch for the inline data deduplication of the second input data stream based on at least a degree of similarity between the first sketch and the second sketch.

2. The computer-implemented method of claim 1, wherein the first set of features or the second set of features comprise a minimal number of features to uniquely identify or distinguish the first segment from the second segment.

3. The computer-implemented method of claim 2, wherein the minimal number of features ranges from 3 features to 15 features.

4. The computer-implemented method of claim 1, wherein the first segment or the second segment has a size of at least 1 megabyte (MB).

5. The computer-implemented method of claim 1, wherein the plurality of chunks comprises at least 100 chunks.

6. The computer-implemented method of claim 1, wherein the plurality of chunks are of variable lengths.

7. The computer-implemented method of claim 6, wherein a size of the first segment is dependent on a sum of lengths of the plurality of chunks.

8. The computer-implemented method of claim 1, wherein the first plurality of chunks are assembled by determining that the sum of lengths of the first plurality of chunks is within the target segment size range, wherein the target segment size range is from 1 megabyte (MB) to 16 MB.

9. The computer-implemented method of claim 1, further comprising generating a fingerprint for each chunk of the first plurality of chunks or the second plurality of chunks.

10. The computer-implemented method of claim 9, wherein the fingerprint is generated using one or more hashing algorithms.

11. The computer-implemented method of claim 9, wherein the fingerprint is generated using one or more non-hashing algorithms.

12. The computer-implemented method of claim 9, wherein the first set of features is associated with a subset of the first plurality of chunks selected from the first plurality of chunks.

13. The computer-implemented method of claim 12, wherein the first set of features comprises a set of fingerprints for the subset of the first plurality of chunks.

14. The computer-implemented method of claim 13, wherein the set of fingerprints comprises a plurality of chunk hashes for the subset of the first plurality of chunks.

15. The computer-implemented method of claim 12, wherein the subset of the first plurality of chunks comprises less than 10% of the plurality of chunks.

16. The computer-implemented method of claim 12, wherein the subset of chunks is selected from the plurality of chunks using one or more fitting algorithms on a plurality of hashes generated for the plurality of chunks.

17. The computer-implemented method of claim 16, wherein the plurality of hashes are generated using two or more different hash functions selected from the group consisting of Secure Hash Algorithm 0 (SHA-0), Secure Hash Algorithm 1 (SHA-1), Secure Hash Algorithm 2 (SHA-2), and Secure Hash Algorithm 3 (SHA-3).

18. The computer-implemented method of claim 17, wherein the one or more fitting algorithms are used to determine a minimum hash for each hash function of the two or more different hash functions.

19. The computer-implemented method of claim 18, wherein each feature of the first set of features comprises the minimum hash for each hash function of the two or more different hash functions.

20. The computer-implemented method of claim 18, wherein the first set of features comprises a vector of the minimum hashes of the two or more different hash functions.

21. The computer-implemented method of claim 20, wherein the first set of features is provided as a linear combination of the features comprising the vector.

22. The computer-implemented method of claim 1, wherein a size of the second segment is different from a size of the first segment.

23. The computer-implemented method of claim 1, wherein a size of the second segment and a size of the first segment are the same.

24. The computer-implemented method of claim 1, wherein the first sketch and the second sketch are useable for the inline deduplication of the second input data stream without generation of a full index of the first plurality of chunks or the second plurality of the chunks.

25. The computer-implemented method of claim 1, wherein the one or more natural breaks are identified based on a pattern in hashes generated by the hash function.

* * * * *

UNITED STATES PATENT AND TRADEMARK OFFICE
CERTIFICATE OF CORRECTION

PATENT NO. : 11,119,995 B2
APPLICATION NO. : 16/718686
DATED : September 14, 2021
INVENTOR(S) : Santhosh Rahul Ponnala and Tarang Vaish It is certified that error appears in the above-identified patent and that said Letters Patent is hereby corrected as shown below:

In the Claims

Column 25, Line 37, Claim 1:
Delete "identify"

Column 25, Line 39, Claim 1:
Delete "for generating a"

Signed and Sealed this
Twenty-eighth Day of March, 2023

Katherine Kelly Vidal
*Director of the United States Patent and Trademark Office*